US009910470B2

(12) United States Patent
Garg et al.

(10) Patent No.: US 9,910,470 B2
(45) Date of Patent: Mar. 6, 2018

(54) CONTROLLING TELEMETRY DATA COMMUNICATION IN A PROCESSOR

(71) Applicant: Intel Corporation, Santa Clara, CA (US)

(72) Inventors: Vivek Garg, Folsom, CA (US); Alexander Gendler, Kiriat Motzkin (IL); Arvind Raman, Austin, TX (US); Ashish V. Choubal, Austin, TX (US); Krishnakanth V. Sistla, Beaverton, OR (US); Dean Mulla, Saratoga, CA (US); Eric J. Dehaemer, Shrewsbury, MA (US); Rahul Agrawal, Santa Clara, CA (US); Guy G. Sotomayor, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 76 days.

(21) Appl. No.: 14/970,747

(22) Filed: Dec. 16, 2015

(65) Prior Publication Data

US 2017/0177046 A1 Jun. 22, 2017

(51) Int. Cl.
*G06F 1/26* (2006.01)
*G06F 1/32* (2006.01)

(52) U.S. Cl.
CPC ............. *G06F 1/26* (2013.01); *G06F 1/3243* (2013.01)

(58) Field of Classification Search
CPC ....................................................... G06F 1/32
See application file for complete search history.

(56) References Cited

U.S. PATENT DOCUMENTS

| 5,163,153 | A |   | 11/1992 | Cole et al. |
|-----------|---|---|---------|-------------|
| 5,469,284 | A | * | 11/1995 | Haas ................. H04Q 11/0001 398/53 |
| 5,522,087 | A |   | 5/1996  | Hsiang |
| 5,590,341 | A |   | 12/1996 | Matter |
| 5,621,250 | A |   | 4/1997  | Kim |
| 5,802,061 | A | * | 9/1998  | Agarwal ............... H04J 3/0682 370/406 |
| 5,931,950 | A |   | 8/1999  | Hsu |
| 6,111,872 | A | * | 8/2000  | Suematsu ................ H04Q 9/04 340/10.2 |
| 6,266,581 | B1 | * | 7/2001 | Wheatley ............... G05B 21/02 700/12 |

(Continued)

FOREIGN PATENT DOCUMENTS

EP  1 282 030 A1  5/2003

OTHER PUBLICATIONS

International Searching Authority, "Notification of Transmittal of the International Search Report and the Written Opinion of the International Searching Authority," dated Feb. 17, 2017, in International application No. PCT/US2016/062175.

(Continued)

*Primary Examiner* — Jaweed A Abbaszadeh
*Assistant Examiner* — Cheri Harrington
(74) *Attorney, Agent, or Firm* — Trop, Pruner & Hu, P.C.

(57) ABSTRACT

In one embodiment, a processor includes cores to execute instructions. At least some of the cores include a telemetry data control logic to send a first telemetry data packet to a power controller according to a stagger schedule to prevent data collisions, and a global alignment counter to count a stagger alignment period. Other embodiments are described and claimed.

16 Claims, 21 Drawing Sheets

(56) References Cited

U.S. PATENT DOCUMENTS

| | | | | |
|---|---|---|---|---|
| 6,347,084 | B1 * | 2/2002 | Hulyalkar | H04B 7/2678 370/347 |
| 6,381,239 | B1 * | 4/2002 | Atkinson | H04M 3/005 370/362 |
| 6,466,220 | B1 * | 10/2002 | Cesana | G06T 1/20 345/537 |
| 6,510,150 | B1 * | 1/2003 | Ngo | H04J 3/0655 370/347 |
| 6,700,478 | B2 * | 3/2004 | Ebermann | G05B 19/0426 340/309.16 |
| 6,748,546 | B1 | 6/2004 | Mirov et al. | |
| 6,792,392 | B1 | 9/2004 | Knight | |
| 6,804,542 | B1 * | 10/2004 | Haartsen | H04W 52/0229 340/7.38 |
| 6,816,510 | B1 * | 11/2004 | Banerjee | H04B 7/269 370/350 |
| 6,823,516 | B1 | 11/2004 | Cooper | |
| 6,829,713 | B2 | 12/2004 | Cooper et al. | |
| 6,996,728 | B2 | 2/2006 | Singh | |
| 7,010,708 | B2 | 3/2006 | Ma | |
| 7,043,649 | B2 | 5/2006 | Terrell | |
| 7,093,147 | B2 | 8/2006 | Farkas et al. | |
| 7,111,179 | B1 | 9/2006 | Girson et al. | |
| 7,194,643 | B2 | 3/2007 | Gonzalez et al. | |
| 7,272,730 | B1 | 9/2007 | Acquaviva et al. | |
| 7,412,615 | B2 | 8/2008 | Yokota et al. | |
| 7,434,073 | B2 | 10/2008 | Magklis | |
| 7,437,270 | B2 | 10/2008 | Song et al. | |
| 7,454,632 | B2 | 11/2008 | Kardach et al. | |
| 7,529,956 | B2 | 5/2009 | Stufflebeam | |
| 7,539,885 | B2 | 5/2009 | Ma | |
| 7,730,340 | B2 | 6/2010 | Hu et al. | |
| 9,319,239 | B2 * | 4/2016 | Bahren | H04L 12/422 |
| 2001/0044909 | A1 | 11/2001 | Oh et al. | |
| 2002/0194509 | A1 | 12/2002 | Plante et al. | |
| 2003/0061383 | A1 | 3/2003 | Zilka | |
| 2003/0099221 | A1 * | 5/2003 | Rhee | H04L 12/12 370/338 |
| 2004/0064752 | A1 | 4/2004 | Kazachinsky et al. | |
| 2004/0098560 | A1 | 5/2004 | Storvik et al. | |
| 2004/0139356 | A1 | 7/2004 | Ma | |
| 2004/0268166 | A1 | 12/2004 | Farkas et al. | |
| 2005/0022038 | A1 | 1/2005 | Kaushik et al. | |
| 2005/0033881 | A1 | 2/2005 | Yao | |
| 2005/0132238 | A1 | 6/2005 | Nanja | |
| 2006/0050670 | A1 | 3/2006 | Hillyard et al. | |
| 2006/0053326 | A1 | 3/2006 | Naveh | |
| 2006/0059286 | A1 | 3/2006 | Bertone et al. | |
| 2006/0069936 | A1 | 3/2006 | Lint et al. | |
| 2006/0117202 | A1 | 6/2006 | Magklis et al. | |
| 2006/0184287 | A1 | 8/2006 | Belady et al. | |
| 2007/0005995 | A1 | 1/2007 | Kardach et al. | |
| 2007/0016817 | A1 | 1/2007 | Albonesi et al. | |
| 2007/0039006 | A1 * | 2/2007 | Krammer | H04L 12/43 718/107 |
| 2007/0079294 | A1 | 4/2007 | Knight | |
| 2007/0106827 | A1 | 5/2007 | Boatright et al. | |
| 2007/0156992 | A1 | 7/2007 | Jahagirdar | |
| 2007/0214342 | A1 | 9/2007 | Newburn | |
| 2007/0239398 | A1 | 10/2007 | Song et al. | |
| 2007/0245163 | A1 | 10/2007 | Lu et al. | |
| 2007/0288928 | A1 * | 12/2007 | Chen | G06F 9/4843 718/102 |
| 2008/0028240 | A1 | 1/2008 | Arai et al. | |
| 2008/0250260 | A1 | 10/2008 | Tomita | |
| 2009/0006871 | A1 | 1/2009 | Liu et al. | |
| 2009/0100189 | A1 * | 4/2009 | Bahren | H04L 12/422 709/231 |
| 2009/0150695 | A1 | 6/2009 | Song et al. | |
| 2009/0150696 | A1 | 6/2009 | Song et al. | |
| 2009/0158061 | A1 | 6/2009 | Schmitz et al. | |
| 2009/0158067 | A1 | 6/2009 | Bodas et al. | |
| 2009/0172375 | A1 | 7/2009 | Rotem et al. | |
| 2009/0172428 | A1 | 7/2009 | Lee | |
| 2009/0235105 | A1 | 9/2009 | Branover et al. | |
| 2009/0259870 | A1 | 10/2009 | Sharma | |
| 2010/0052862 | A1 * | 3/2010 | Hsieh | G06K 7/10059 340/10.2 |
| 2010/0115309 | A1 | 5/2010 | Carvalho et al. | |
| 2010/0138171 | A1 * | 6/2010 | George | B63H 9/0642 702/50 |
| 2010/0146513 | A1 | 6/2010 | Song | |
| 2010/0161866 | A1 * | 6/2010 | Weber | G06F 13/4027 710/305 |
| 2010/0191997 | A1 | 7/2010 | Dodeja et al. | |
| 2011/0154090 | A1 | 6/2011 | Dixon et al. | |
| 2012/0079290 | A1 | 3/2012 | Kumar | |
| 2012/0226926 | A1 | 9/2012 | Gunther et al. | |
| 2012/0244799 | A1 * | 9/2012 | Yoshikawa | H04W 52/0254 455/39 |
| 2012/0246506 | A1 | 9/2012 | Knight | |
| 2012/0291035 | A1 * | 11/2012 | Barth | G05B 19/0421 718/102 |
| 2013/0061064 | A1 | 3/2013 | Ananthakrishnan et al. | |
| 2013/0080803 | A1 | 3/2013 | Ananthakrishnan et al. | |
| 2013/0080804 | A1 | 3/2013 | Ananthakrishnan et al. | |
| 2013/0111120 | A1 | 5/2013 | Ananthakrishnan et al. | |
| 2013/0111121 | A1 | 5/2013 | Ananthakrishnan et al. | |
| 2013/0111226 | A1 | 5/2013 | Ananthakrishnan et al. | |
| 2013/0111236 | A1 | 5/2013 | Ananthakrishnan et al. | |
| 2013/0272277 | A1 * | 10/2013 | Suwa | H04W 56/0015 370/336 |
| 2013/0346774 | A1 | 12/2013 | Bhandaru et al. | |
| 2014/0068290 | A1 | 3/2014 | Bhandaru et al. | |
| 2014/0164799 | A1 * | 6/2014 | Liu | G06F 1/206 713/320 |
| 2014/0195829 | A1 | 7/2014 | Bhandaru et al. | |
| 2014/0208141 | A1 | 7/2014 | Bhandaru et al. | |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 3 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (141-14.9.5), 44 pages.

(56) References Cited

OTHER PUBLICATIONS

U.S. Appl. No. 14/812,056, filed Jul. 29, 2015, entitled "Masking a Power State of a Core of a Processor," by Alexander Gendler, et al.
U.S. Appl. No. 14/609,835, filed Jan. 30, 2015, entitled "Communicating Via a Mailbox Interfact of a Processor," by Alexander Gendler, et al.
U.S. Appl. No. 14/609,886, filed Jan. 30, 2015, entitled "Performing Context Save and Restore Operations in a Processor," by Alexander Gendler, et al.

* cited by examiner

CONTROLLING TELEMETRY DATA COMMUNICATION IN A PROCESSOR

FIELD OF THE INVENTION

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
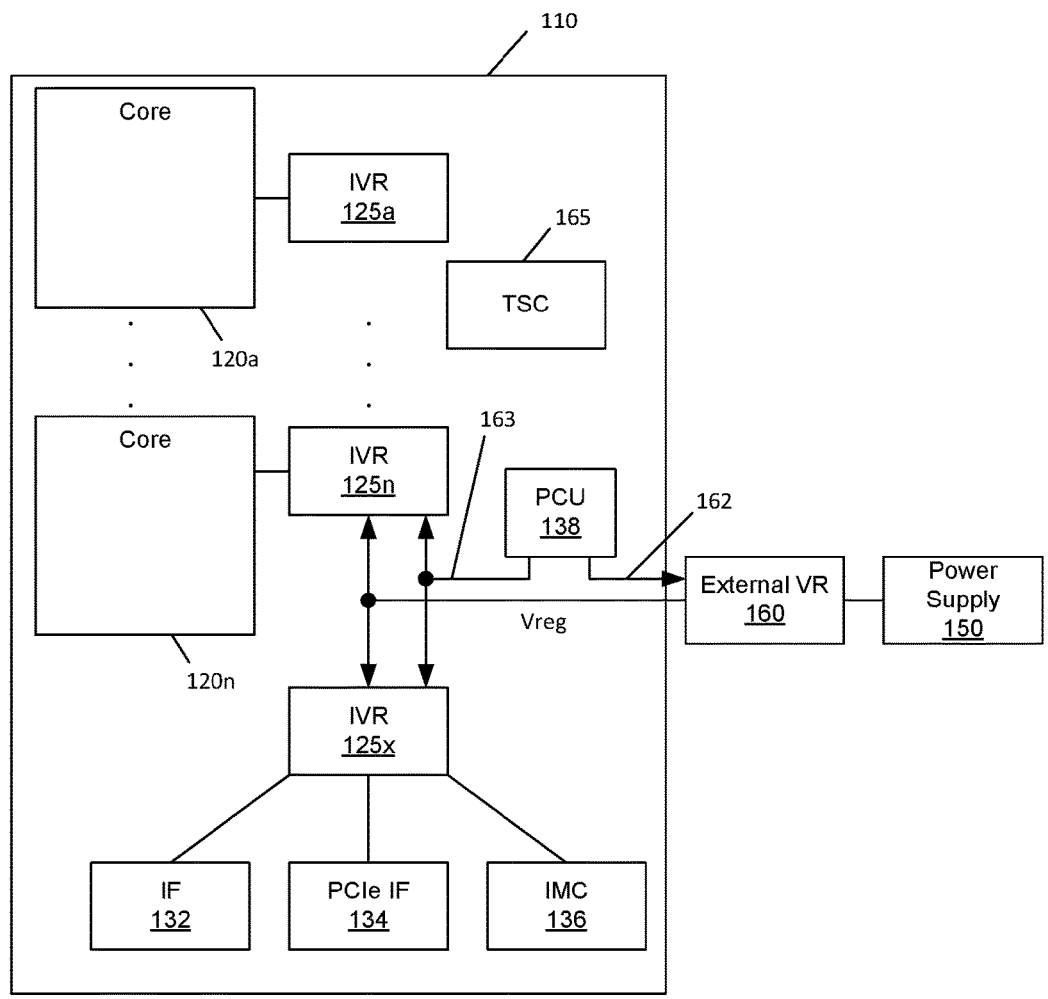
FIG. 1 is a block diagram of a portion of a system in accordance with an embodiment of the present invention.

In various embodiments, individual elements of a multi-core processor, such as individual cores and/or other logics (generally referred to herein as intellectual property (IP) logic), may be controlled to enable communication of telemetry data to a power controller of the processor in a manner that coordinates and staggers such communication so that data collisions between the telemetry data sent by the different logic are avoided. In this way, bandwidth traffic e.g., on a sideband communication link, can be reduced. Still further, embodiments provide a telemetry packetization technique to minimize the amount of data to be communicated. To this end, different telemetry data packet formats to enable communication of different types of telemetry data of different sizes and at different frequencies or periodicity, based on the type of telemetry data.

In embodiments, a power controller or other control logic may define staggering of such communications based on alignment of all such IP blocks within a common counter, such as a timestamp counter. In addition, to account for variability in such stagger schedule over time, a long-term realignment technique may also be used.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage Vreg to processor 110.

As seen, processor 110 may be a single die processor including multiple cores 120a-120n. In addition, each core may be associated with an integrated voltage regulator (IVR) 125a-125n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. Similarly, cores 120 may include or be associated with independent clock generation circuitry such as one or more phase lock loops (PLLs) to control operating frequency of each core 120 independently.

Still referring to FIG. 1, additional components may be present within the processor including an input/output interface (IF) 132, another interface 134, and an integrated memory controller (IMC) 136. As seen, each of these components may be powered by another integrated voltage regulator $125_x$. In one embodiment, interface 132 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include circuitry including hardware, software and/or firmware to perform power management operations with regard to processor 110. As seen, PCU 138 provides control information to external voltage regulator 160 via a digital interface 162 to cause the voltage regulator to generate the appropriate regulated voltage. PCU 138 also provides control information to IVRs 125 via another digital interface 163 to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). Also, PCU 138 may control communication of telemetry data from cores 120 and other logic in a manner to avoid data collisions, as described further herein.

In FIG. 1, PCU 138 is illustrated as being present as a separate logic of the processor. In other cases PCU logic 138 may execute on a given one or more of cores 120. In some cases, PCU 138 may be implemented as a microcontroller (dedicated or general-purpose) or other control logic configured to execute its own dedicated power management code, sometimes referred to as P-code. In yet other embodiments, power management operations to be performed by PCU 138 may be implemented externally to a processor, such as by way of a separate power management integrated circuit (PMIC) or other component external to the processor. In yet other embodiments, power management operations to be performed by PCU 138 may be implemented within BIOS or other system software.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package.

While not shown for ease of illustration, understand that additional components may be present within processor 110 such as uncore logic, and other components such as internal memories, e.g., one or more levels of a cache memory hierarchy and so forth. For example, processor 100 may include a timestamp counter 165. Furthermore, while shown in the implementation of FIG. 1 with an integrated voltage regulator, embodiments are not so limited. For example, other regulated voltages may be provided to on-chip resources from external voltage regulator 160 or one or more additional external sources of regulated voltages.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic, overclocking, or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Power management techniques also may be used when constraints exist in an operating environment. For example, when a power and/or thermal constraint is encountered, power may be reduced by reducing operating frequency and/or voltage. Other power management techniques include throttling instruction execution rate or limiting scheduling of instructions. Still further, it is possible for instructions of a given instruction set architecture to include express or implicit direction as to power management operations. Although described with these particular examples, understand that many other power management techniques may be used in particular embodiments.

Figure 2:
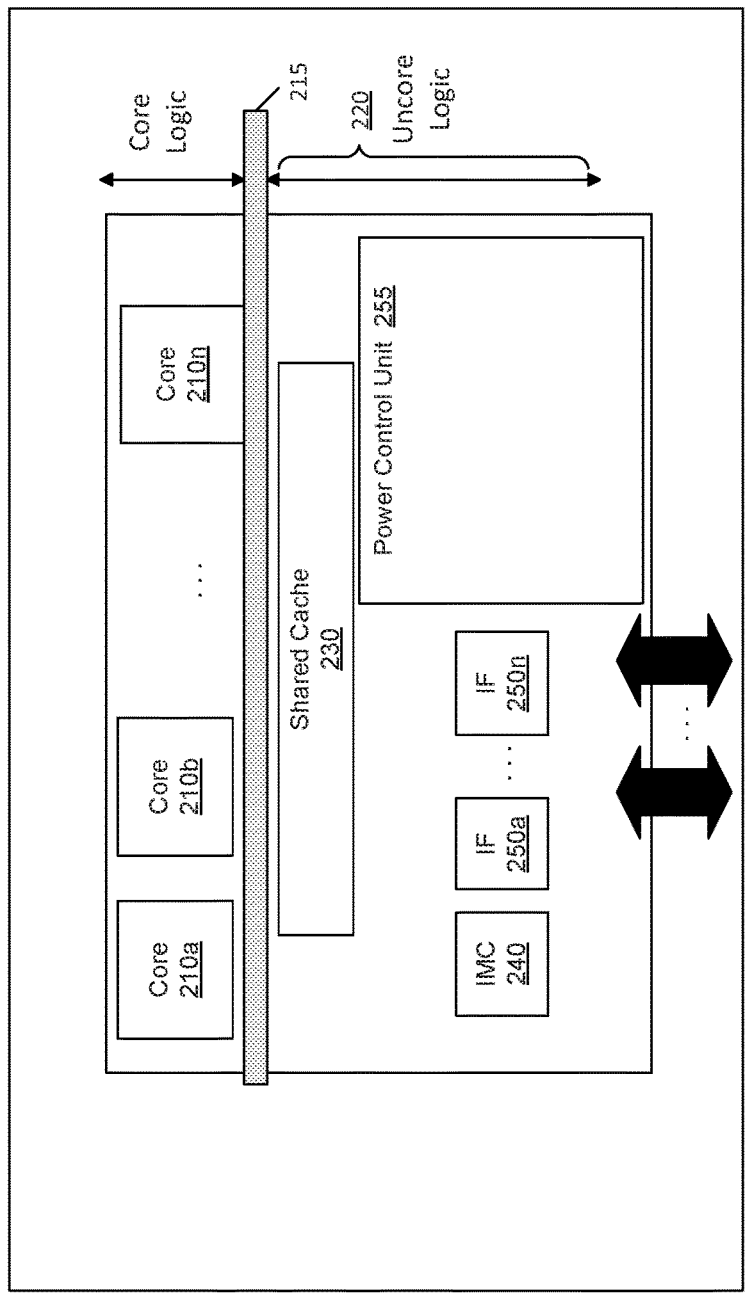
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. One or more cores 210 may be heterogeneous to the other cores, e.g., having different micro-architectures, instruction set architectures, pipeline depths, power and performance capabilities. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management and telemetry data communication techniques described herein.

In addition, by interfaces $250a$-$250n$, connection can be made to various off-chip components such as peripheral devices, mass storage and so forth. While shown with this particular implementation in the embodiment of FIG. 2, the scope of the present invention is not limited in this regard.

Figure 3:
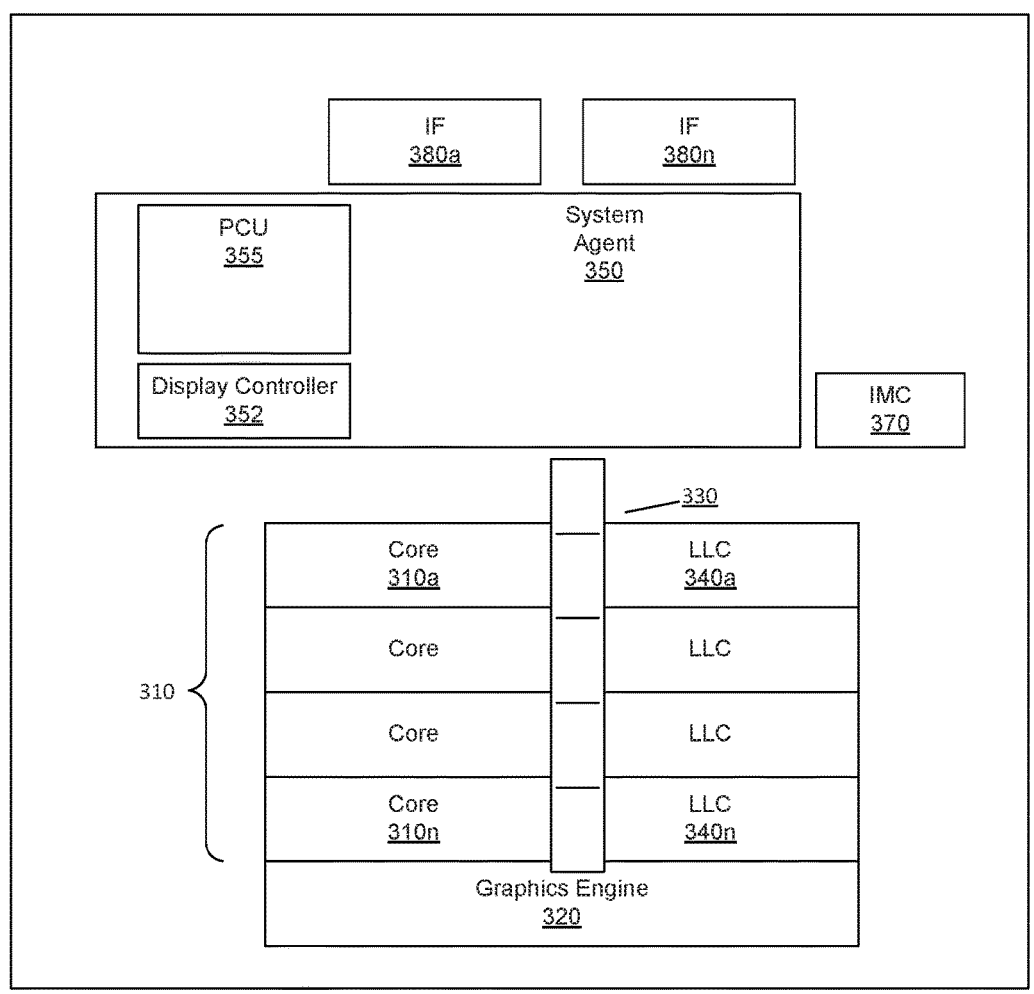
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310a$-$310n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340a$-$340n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management and telemetry data communication techniques described herein.

As further seen in FIG. 3, processor 300 can further include an integrated memory controller (IMC) 370 that can provide for an interface to a system memory, such as a dynamic random access memory (DRAM). Multiple interfaces $380a$-$380n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
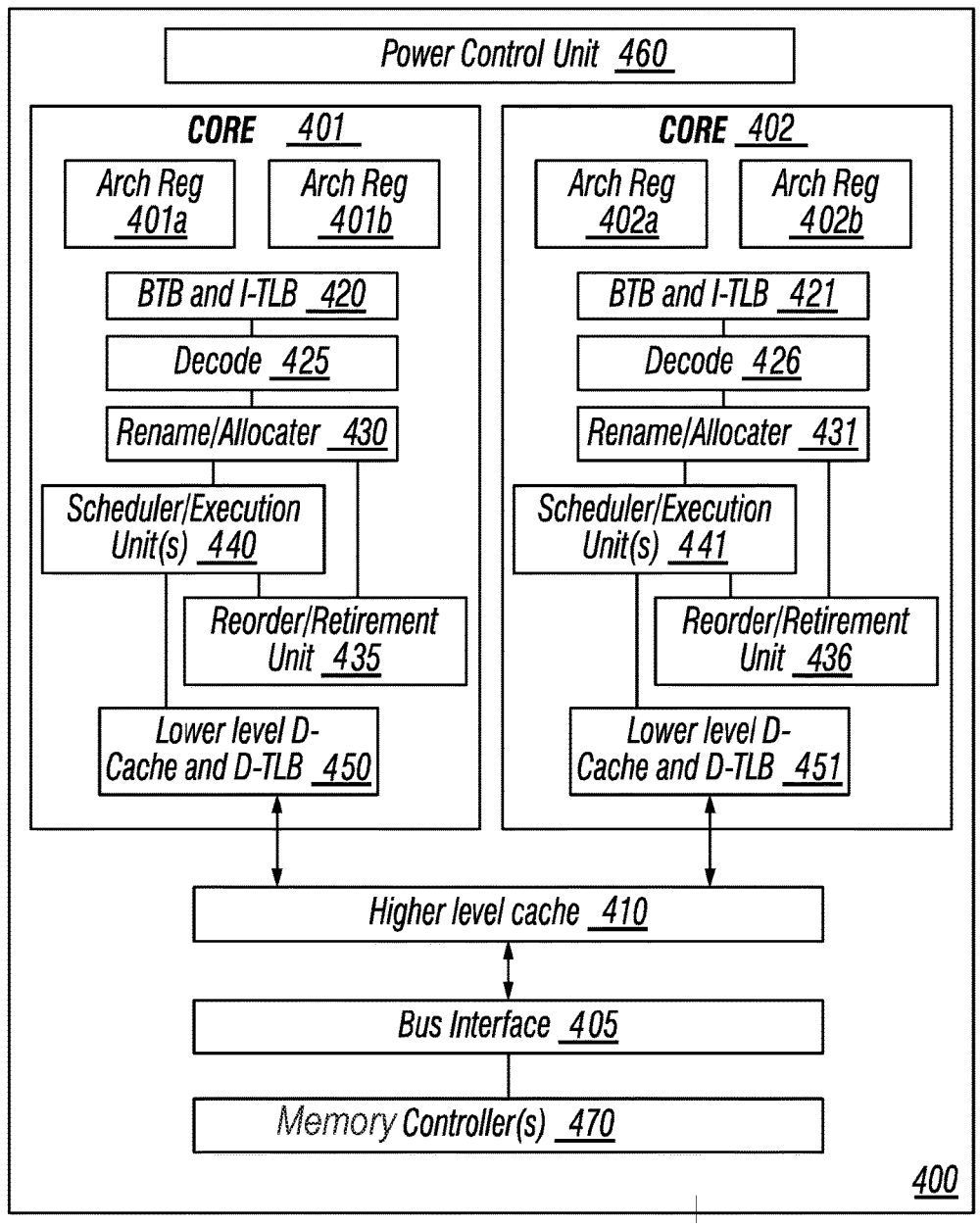
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, branch target buffer and instruction translation lookaside buffer (BTB and I-TLB) 420, load/store buffers, and queues may be shared through partitioning. Other resources, such as general purpose internal registers, page-table base register(s), low-level data-cache and data-TLB 450, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to a fetch unit to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results.

Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation lookaside buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power control unit 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
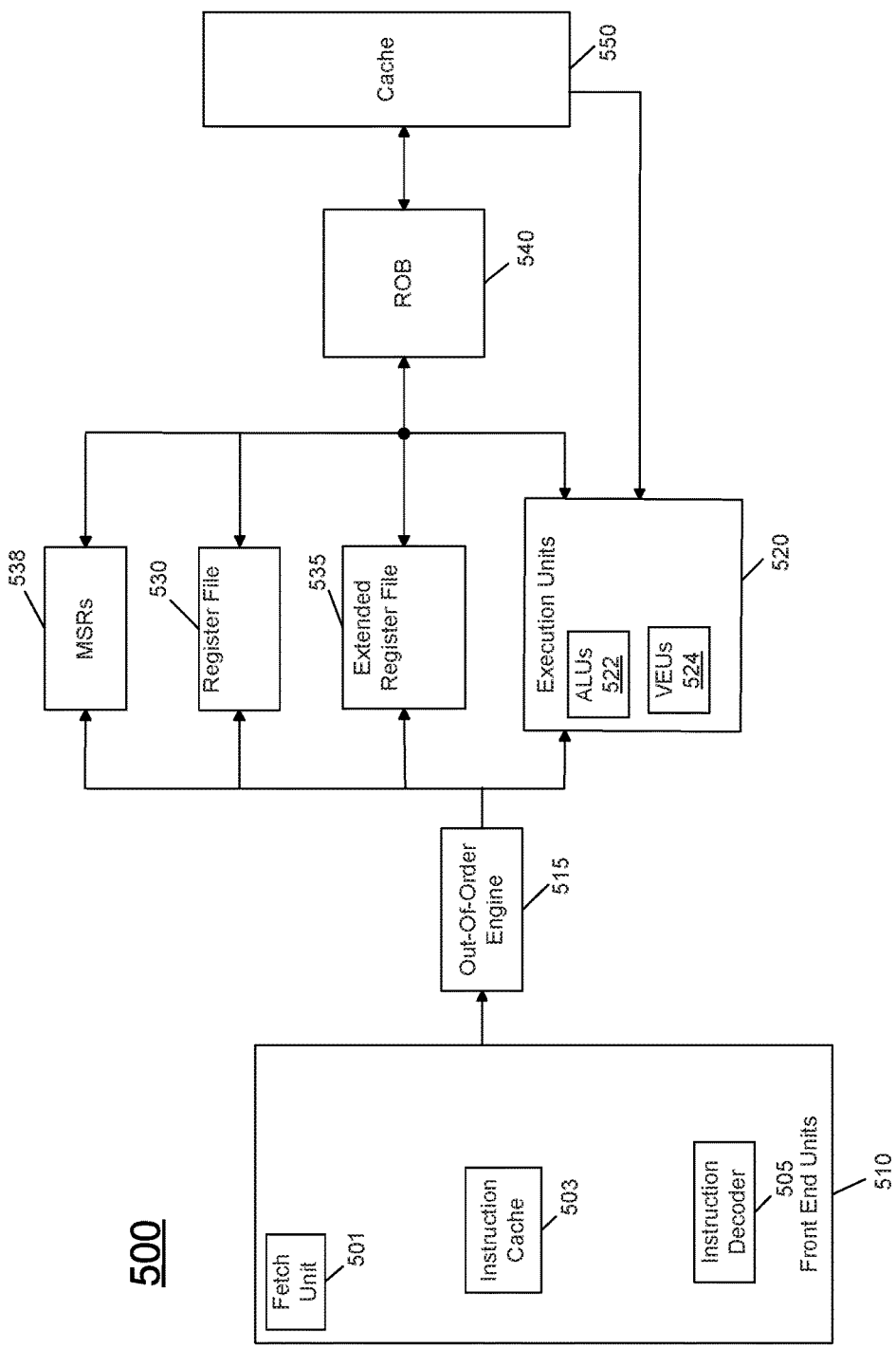
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
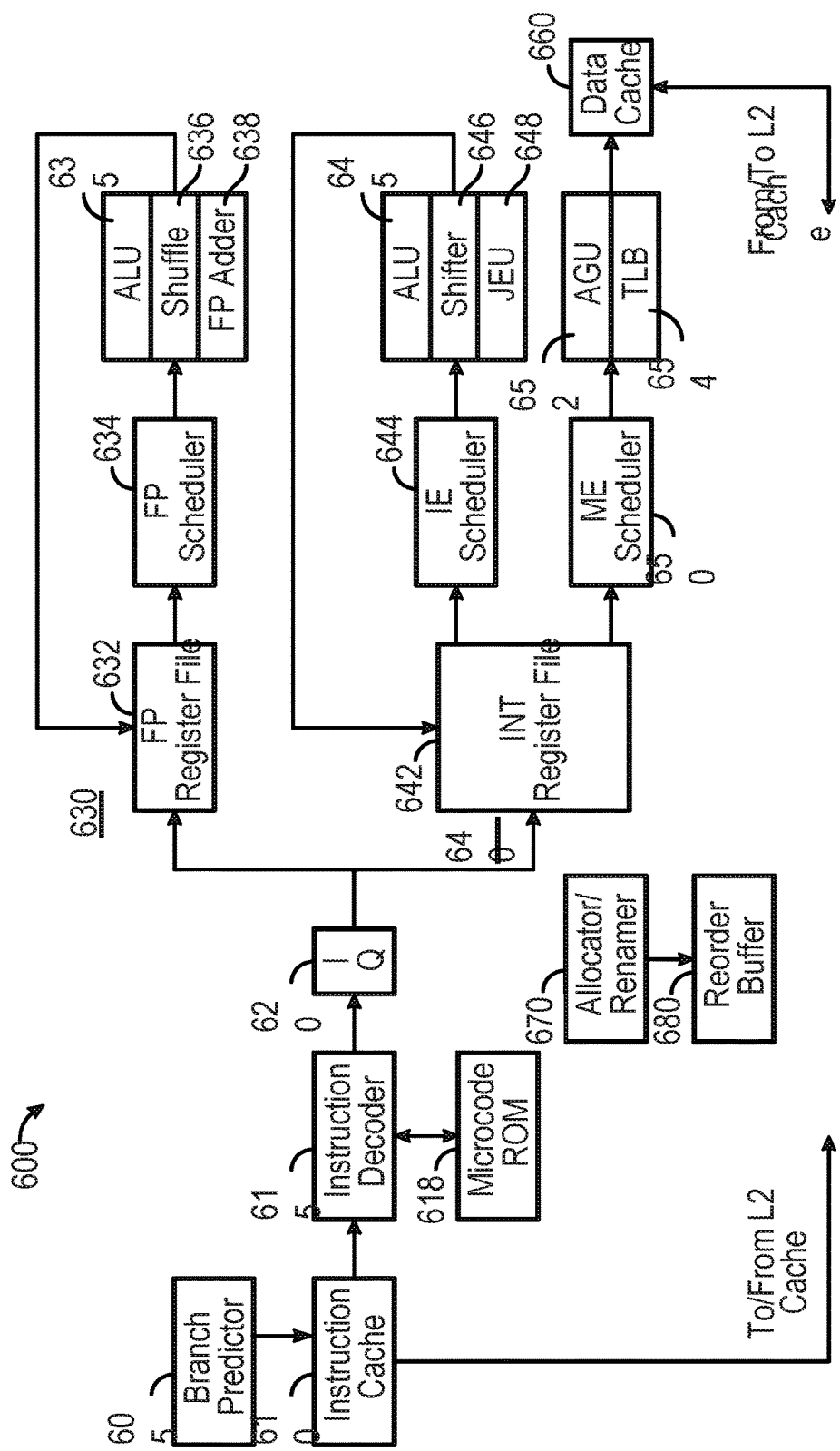
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue (IQ) 620 for storage and delivery to a given execution pipeline. A microcode ROM 618 is coupled to instruction decoder 615.

A floating point pipeline 630 includes a floating point (FP) register file 632 which may include a plurality of architectural registers of a given bit width such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer (INT) register file 642 which may include a plurality of architectural registers of a given bit width such as 128 or 256 bits. Pipeline 640 includes an integer execution (IE) scheduler 644 to schedule instructions for execution on one of multiple execution units of the pipeline. In the embodiment shown, such execution units include an ALU 645, a shifter unit 646, and a jump execution unit (JEU) 648. In turn, results generated in these execution units may be provided back to buffers and/or registers of register file 642. Of course understand while shown with these few example execution units, additional or different integer execution units may be present in another embodiment.

A memory execution (ME) scheduler 650 may schedule memory operations for execution in an address generation unit (AGU) 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
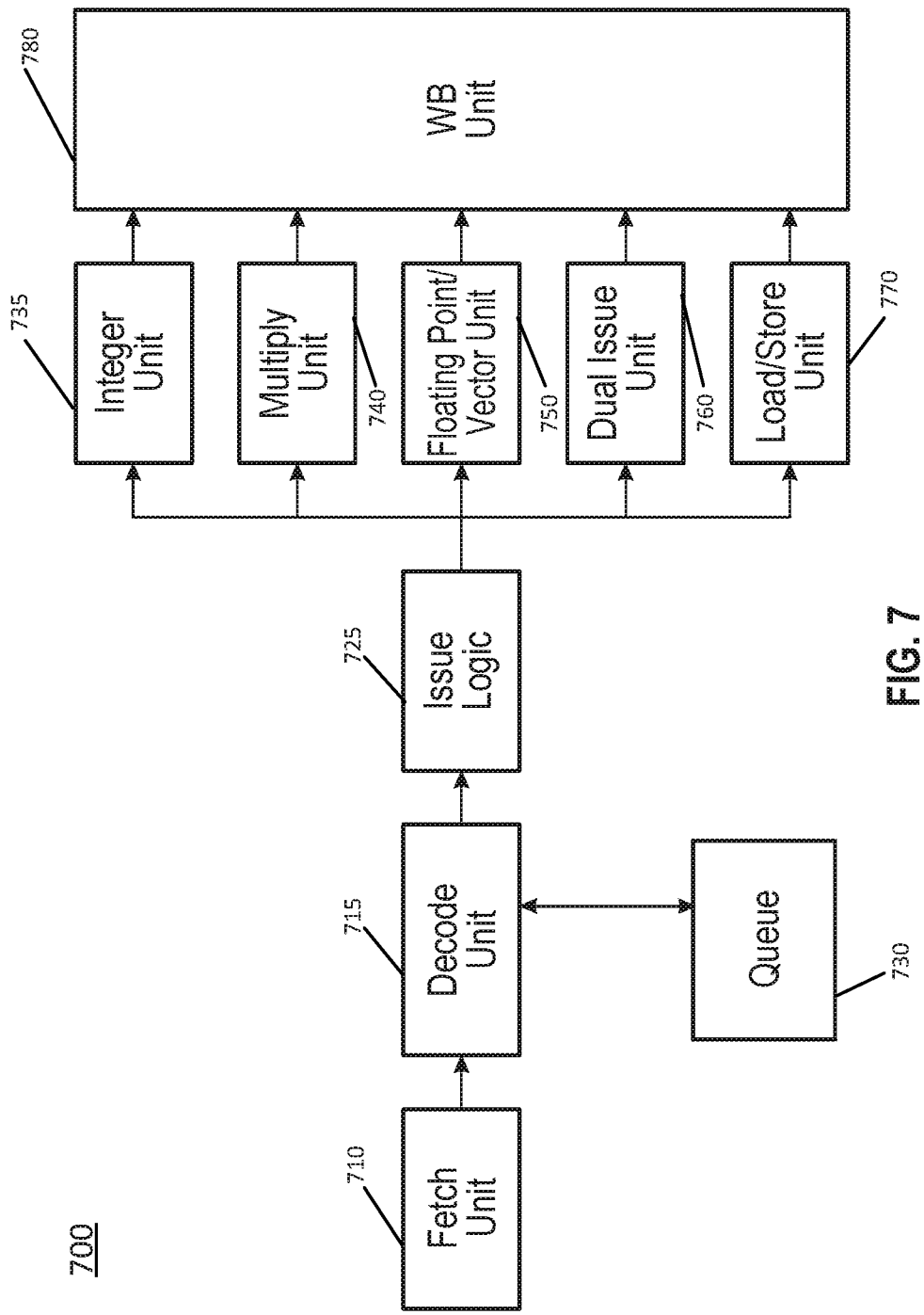
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback (WB) unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
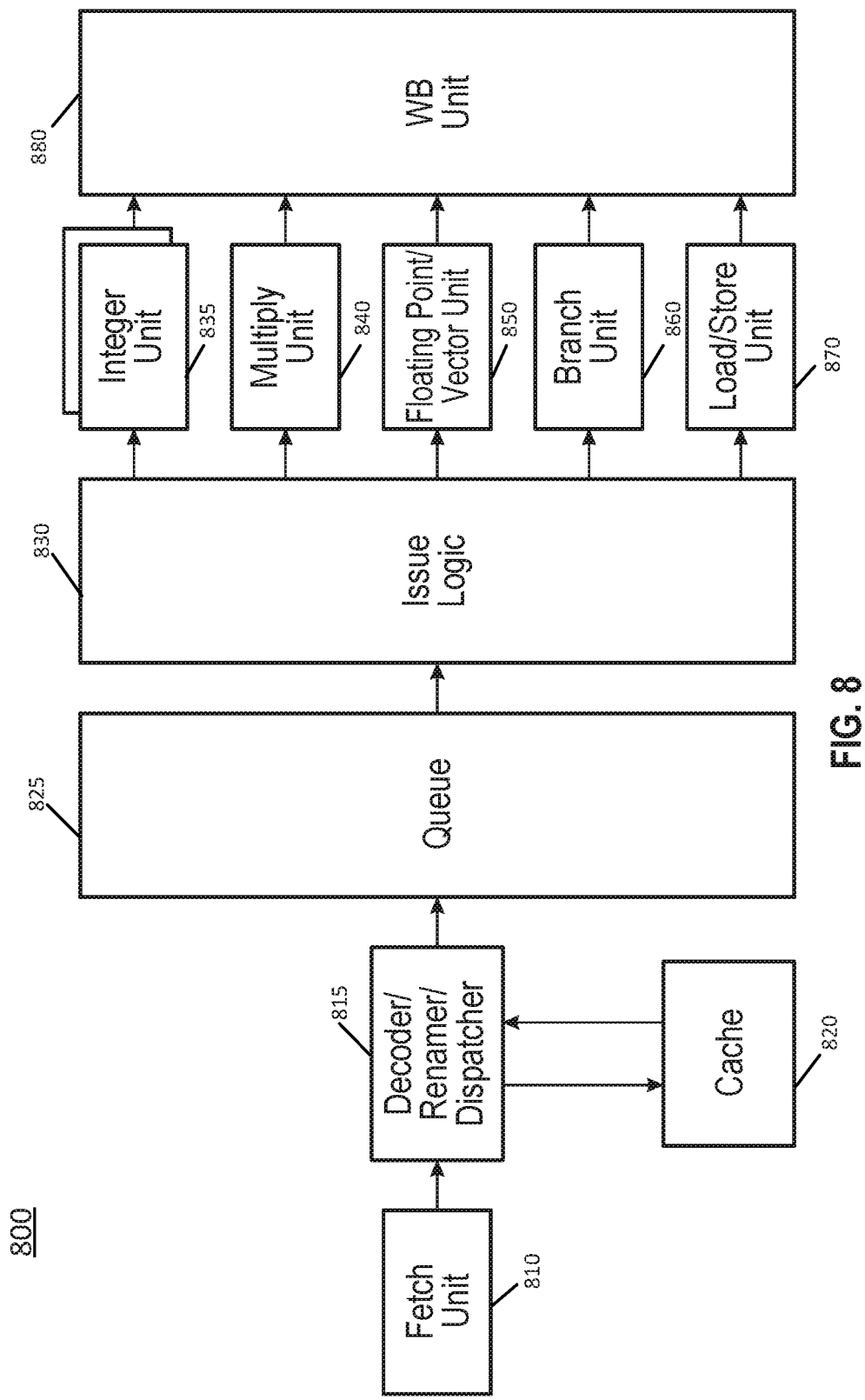
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher unit 815 coupled to a cache 820. Unit 815 may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
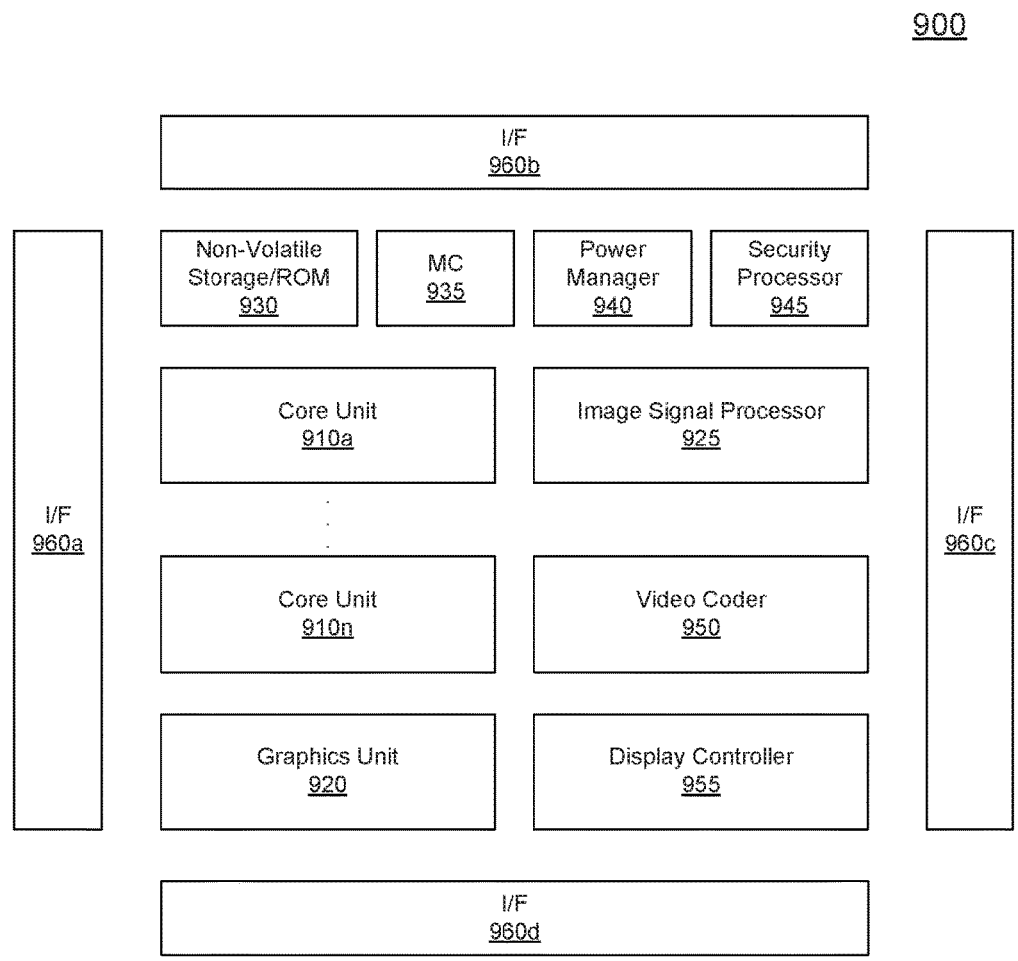
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, which may incorporate a heterogeneous system architecture having a heterogeneous system architecture-based processor design.

In the high level view shown in FIG. 9, processor 900 includes a plurality of core units 910*a*-910*n*. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management and telemetry data communication techniques described herein.

In some embodiments, SoC 900 may further include a non-coherent fabric coupled to the coherent fabric to which various peripheral devices may couple. One or more interfaces 960*a*-960*d* enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
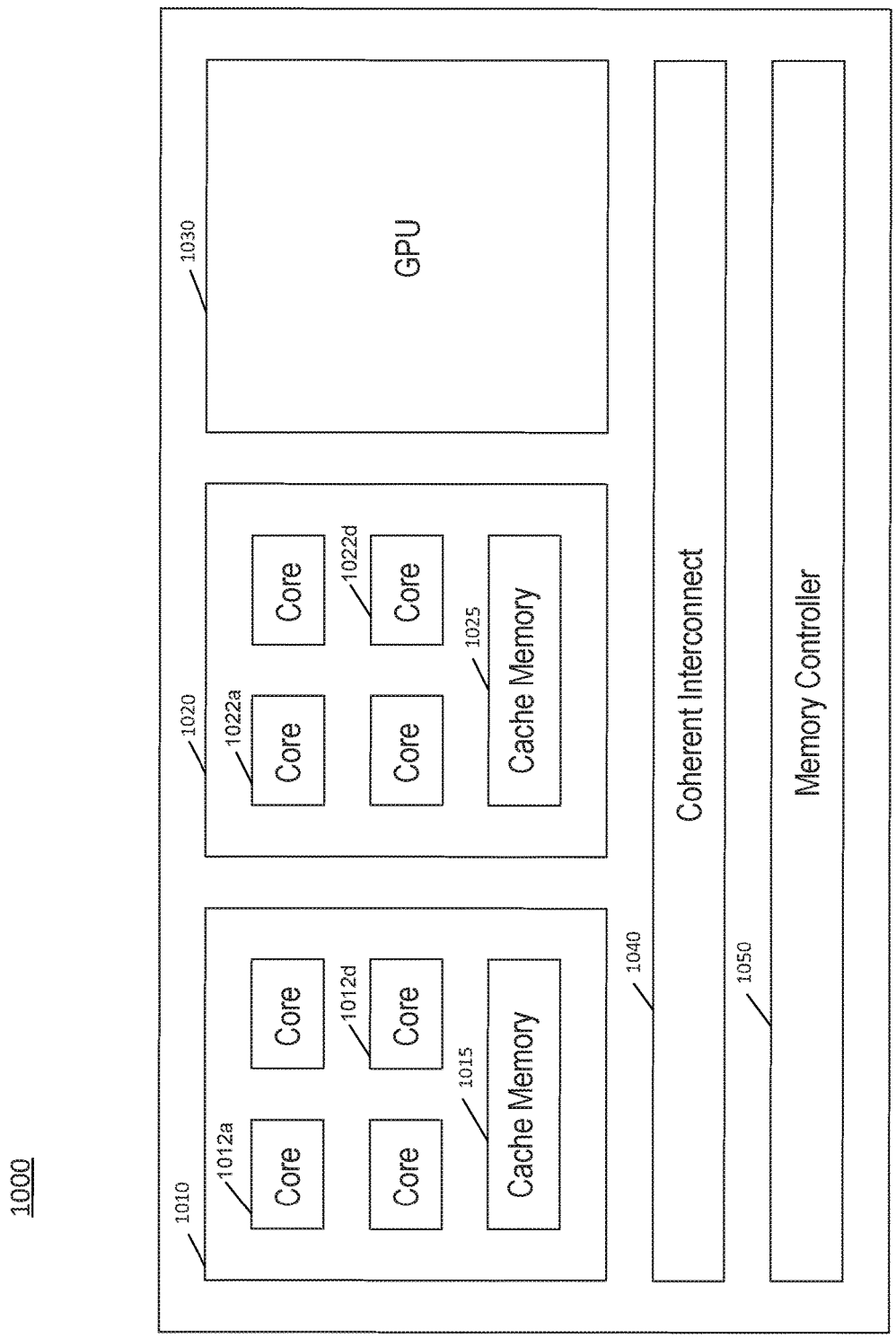
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores 1012*a*-1012*d*. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores 1022*a*-1022*d*. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
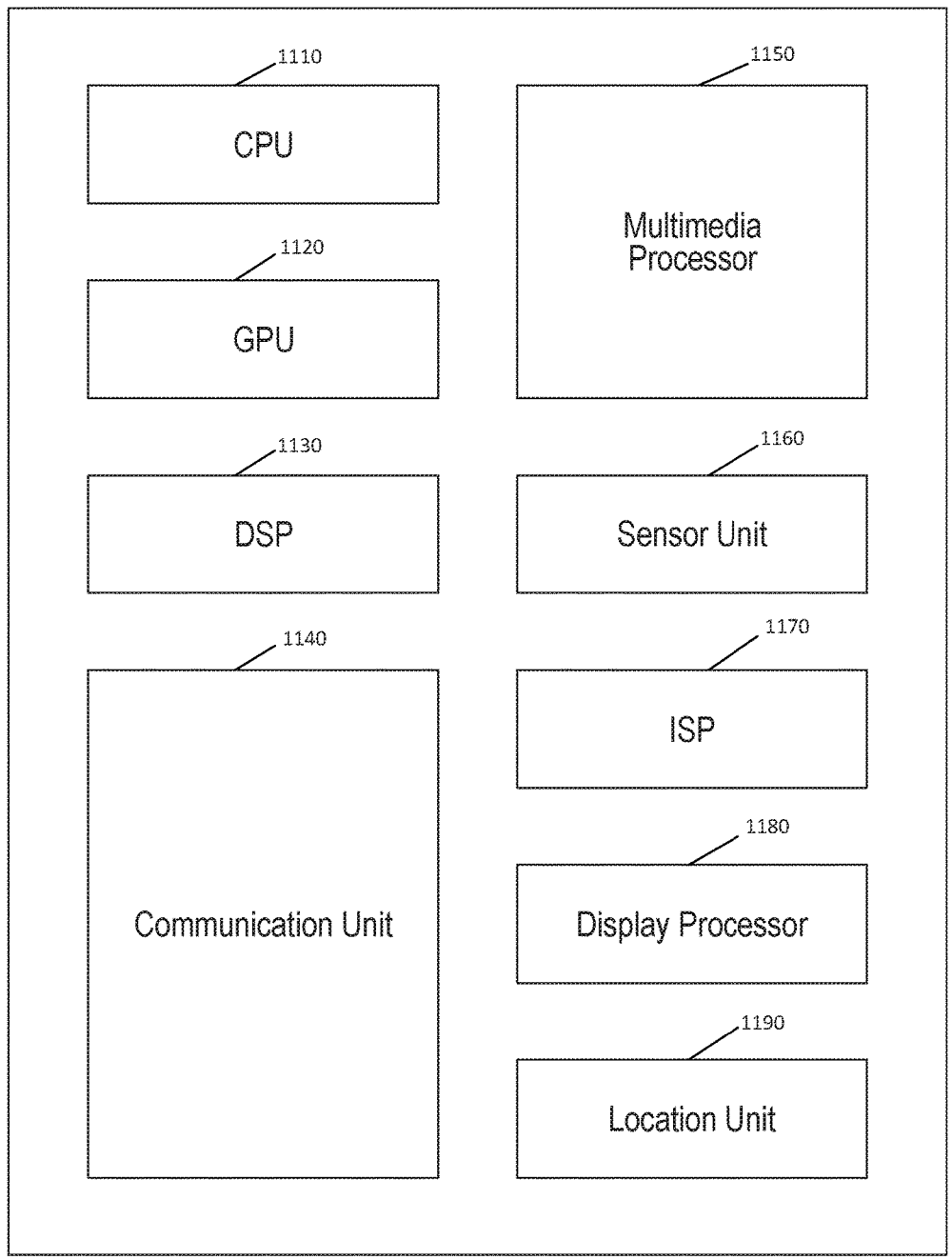
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processing unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
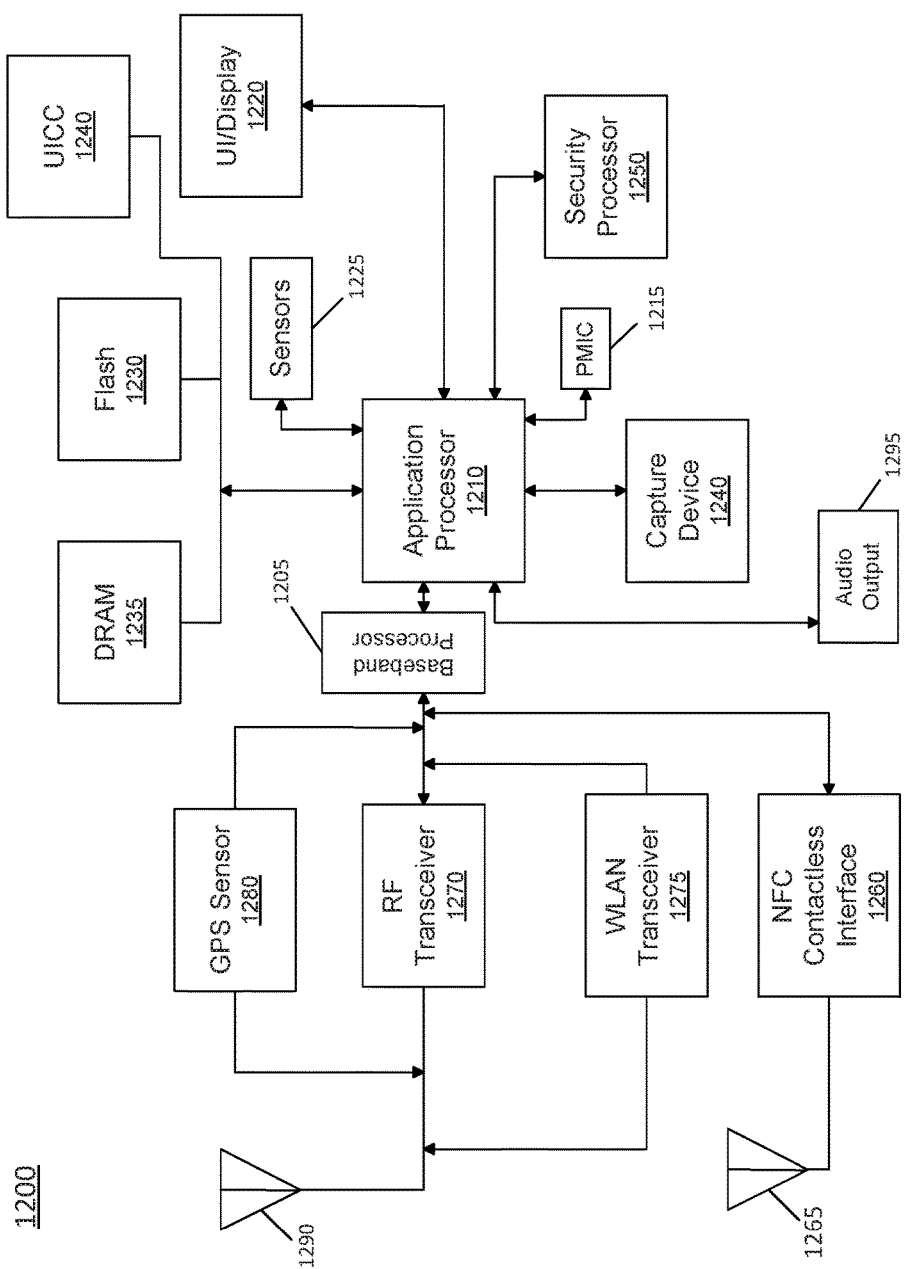
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
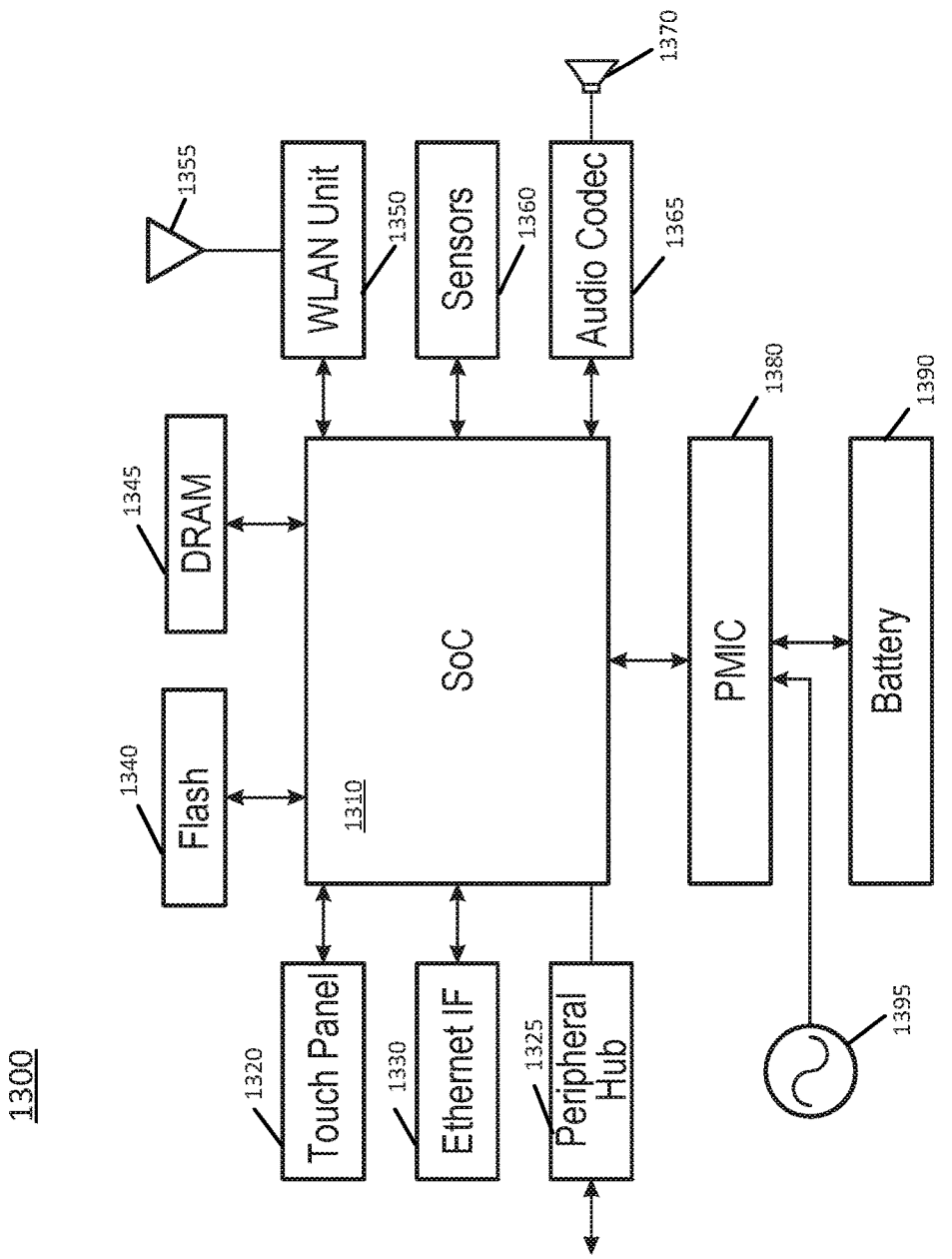
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
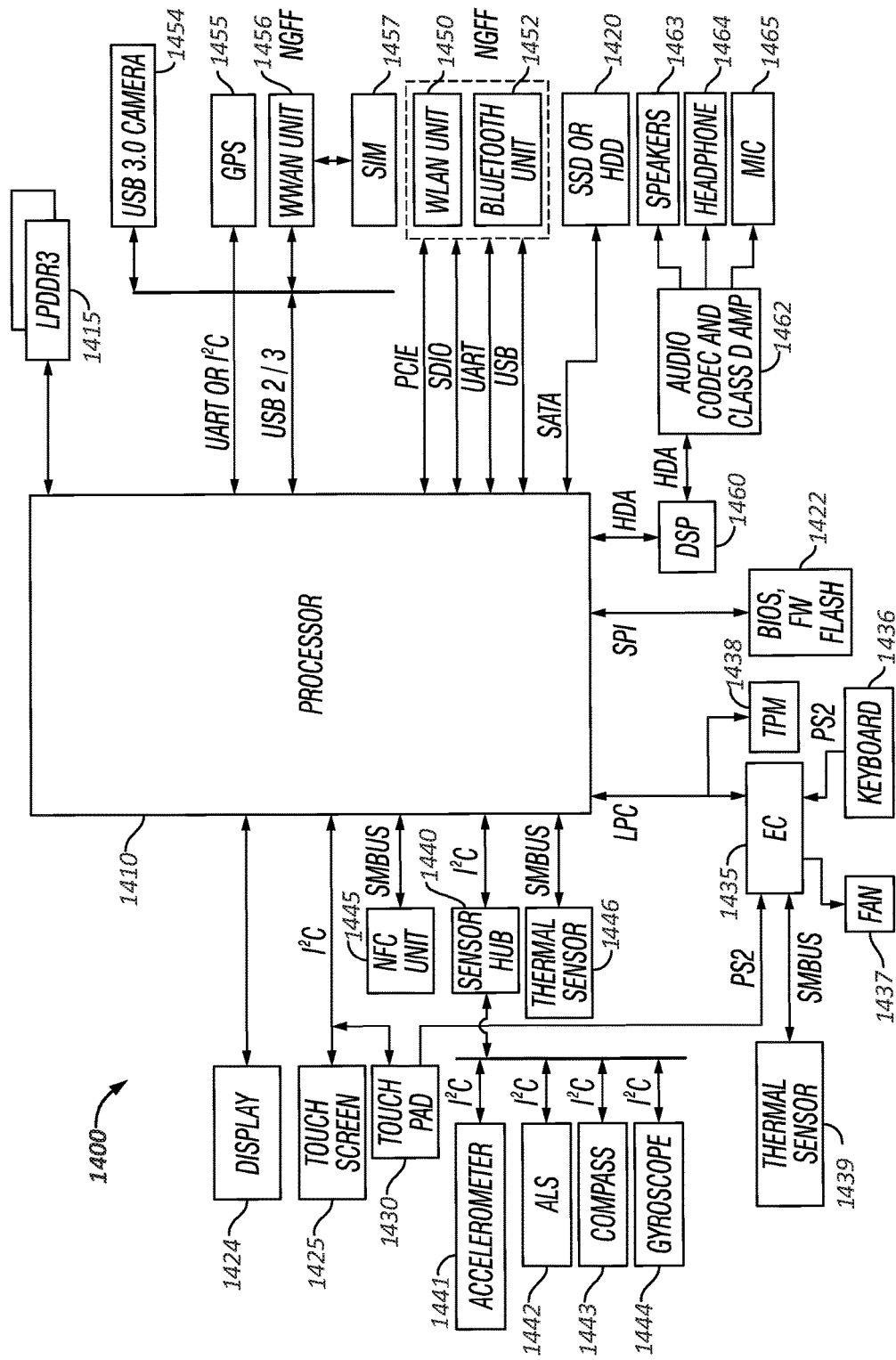
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400, and may include power management circuitry as described herein. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
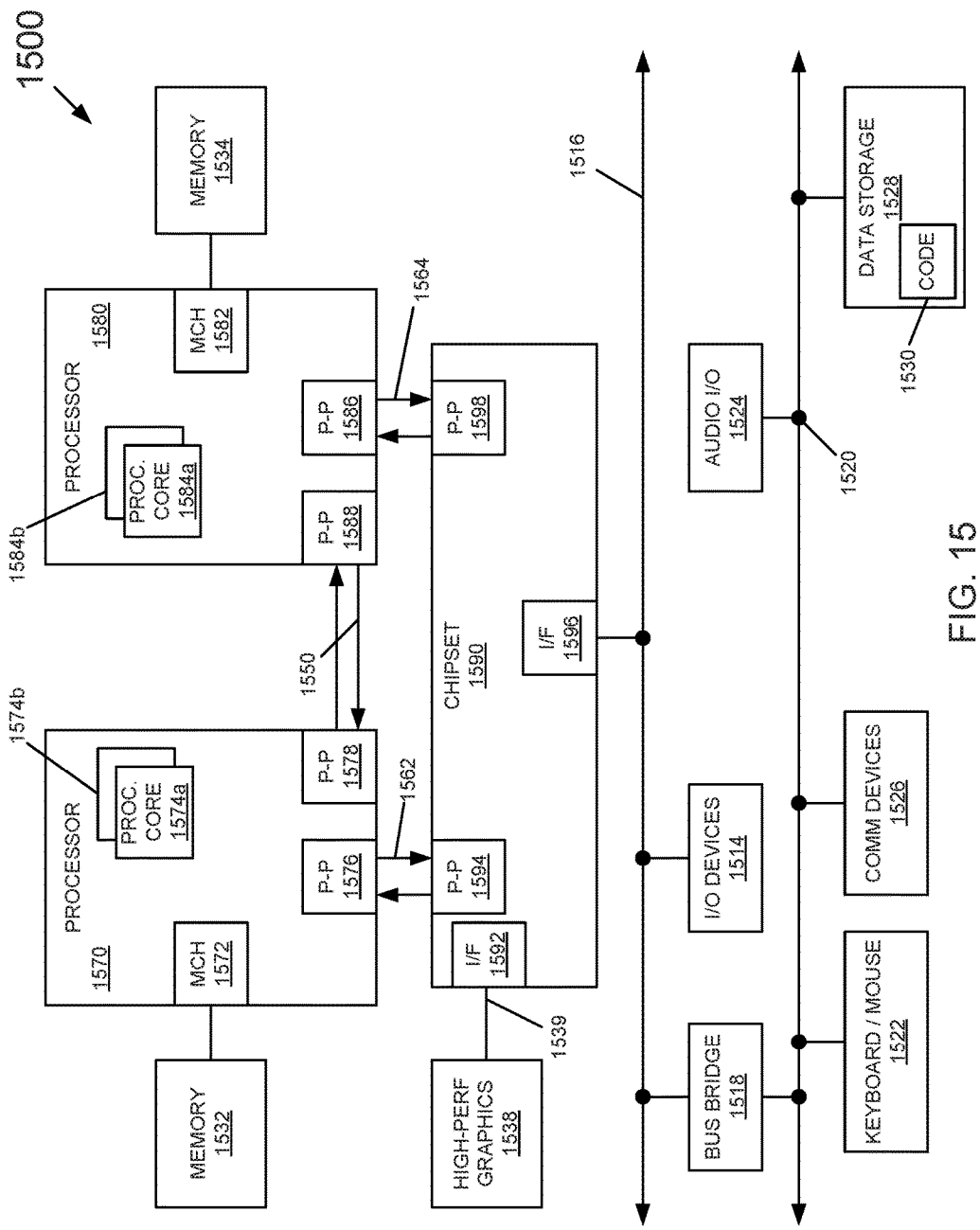
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management and telemetry data communication techniques as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
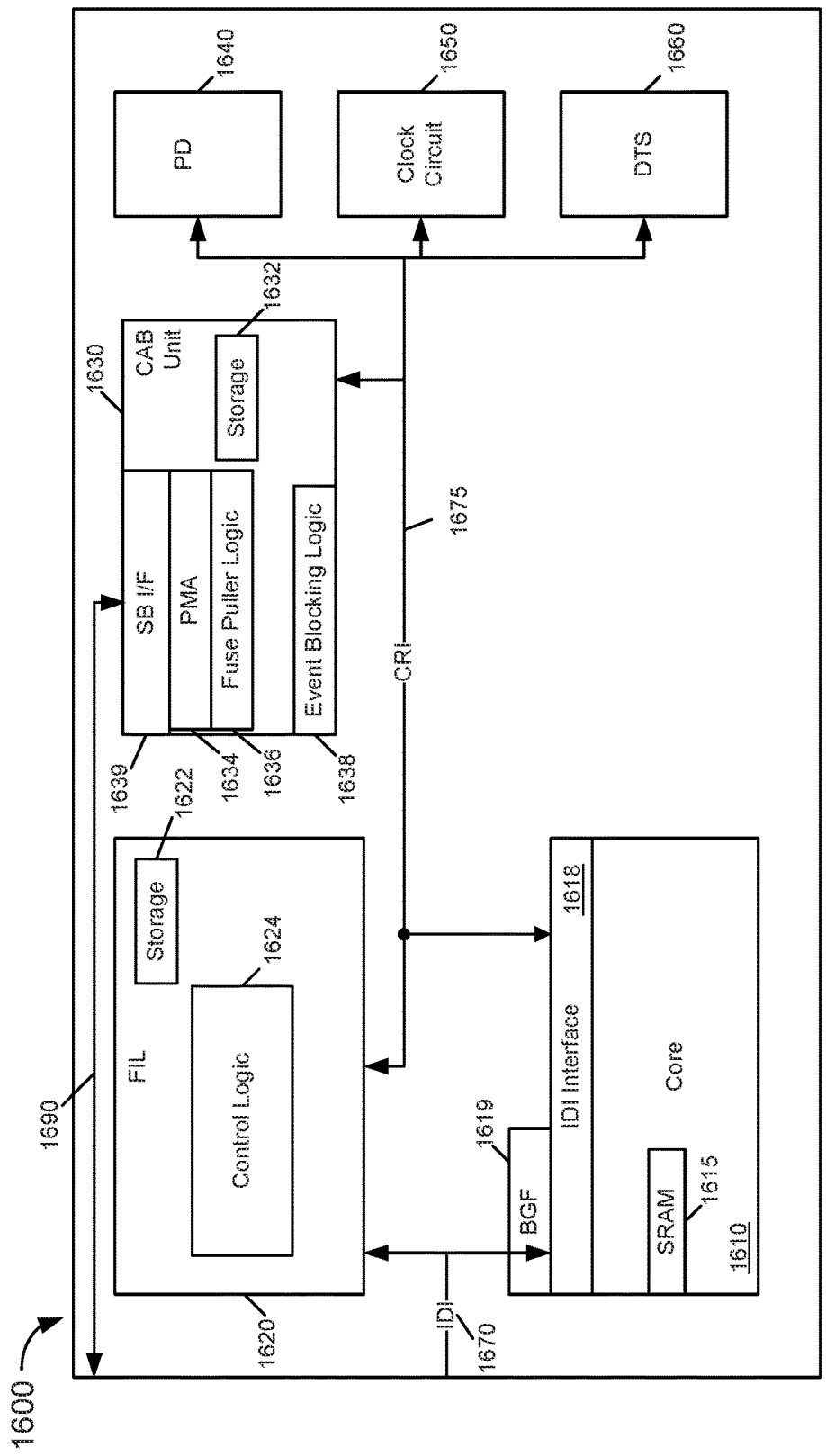
FIG. 16 is a block diagram of a processor in accordance with an embodiment of the present invention.

Referring now to FIG. 16, shown is a block diagram of a processor in accordance with an embodiment of the present invention. As shown in FIG. 16, processor 1600 includes a core 1610 and various core perimeter logic. Understand that for ease of illustration only a single core 1610 is shown. However, in many embodiments a multicore processor includes a plurality of cores, each with its own core perimeter logic. In the high level shown in FIG. 16, the components of processor 1600 all may be implemented on a single semiconductor die. As seen, core 1610 includes a storage 1615, which in an embodiment may be a static random access memory (SRAM) in which various context or state information of the core is stored. Note that the terms "state information" and "context information" are used interchangeably herein, and refer to information such as control register values, data information, register-stored information, and other information associated with a thread being executed on a core or other logic. Such information can be saved when the corresponding thread is switched from the core, e.g., due to entry into a low power state or migration to another core.

In an embodiment, storage 1615 may be configured to remain powered on while the core is in certain low power states. As an example, storage 1615 may maintain information while a core is in a given low power state (e.g., C6) and the processor package is in a package active state (C0). However, in other low power states, such power may not be available, and the context information may be sent to other storages as described herein.

Core 1610 further includes an intra-die interconnect (IDI) interface 1618 to interface with an IDI 1670. Although not shown for ease of illustration, understand that IDI 1670 may couple core 1610 with various other circuitry within the processor (not shown for ease of illustration in FIG. 16), including one or more other cores, a peripheral controller hub (PCH), one or more cache memories and/or other uncore circuitry. To provide for an interface between core 1610 and other components within the processor that may operate at different frequencies, a clock crossing logic 1619 may be provided, which in an embodiment may be implemented as a bubble generator first in first out (FIFO) buffer.

To enable core 1610 to enter into particular and deeper low power states when available, a first core perimeter logic, namely a fabric interface logic (FIL) 1620, is coupled to core 1610. FIL 1620 may be of a first sustain power domain, in that it is provided with power and clock signals when at least portions of the processor are in a low power state. As seen, FIL 1620 couples to core 1610 via both IDI 1670 and a second interconnect 1675, which in an embodiment is a control register interconnect (CRi). Interconnect 1675 may be a relatively simple and low performance interconnect to provide for communication of state information during save and restore operations for low power state entry and exit.

In the embodiment shown in FIG. 16, FIL 1620 includes a storage 1622, which may be implemented as a plurality of registers configured to store the state information received from core 1610 prior to the core's entry into a given low power state. A control logic 1624 may be configured to maintain power to FIL 1620 until the processor package enters a deeper package low power state (e.g., a package C6 state) when a coherent fabric enters a low power state.

Still referring to FIG. 16, an additional core perimeter logic is a chassis adapter block (CAB) unit 1630. In general, CAB unit 1630 may be configured to provide an interface to other processor and system components via a sideband interconnect 1690, at least a portion of which may be configured as a power management sideband link to enable control and communication of telemetry data as described herein. Still further, CAB unit 1630 may be configured to store state information of core 1610 when FIL 1620 itself is placed into a low power state. CAB unit 1630 may be of a second sustain power domain, in that it is provided with power and clock signals when other portions of processor 1600 (including FIL 1620) are in a low power state. CAB unit 1630 includes a storage 1632 that may be configured to store the state information obtained from FIL 1620. In an embodiment, storage 1632 of CAB unit 1630 may be a fast storage array, e.g., implemented as a SRAM.

In the embodiment shown, CAB unit 1630 includes a power management agent (PMA) 1634, a fuse puller logic 1636 that may include one or more finite state machines (FSMs) to perform save and restore operations, both with regard to storage 1622 and more distant portions of a memory hierarchy (e.g., a system memory) when CAB unit 1630 itself is to be placed into a low power state. For example, the information stored in storage 1622 may be flushed to system memory when the processor package enters a still deeper package low power state (e.g., a package C10 state). In an embodiment, these FSMs may be SoC-based FSMs as they enable interaction between core perimeter logic and other portions of an SoC (and onto further portions of a memory hierarchy). Note that PMA 1634 may be a portion of power management logic of a processor that may be active when CAB unit 1630 is powered on. In some cases, PMA 1634 may interface with a main power controller of a processor such as a PCU or other power management entity, and may include one or more telemetry push FSMs and corresponding control logic, as described herein. As such, PMA 1634 may communicate telemetry data in a manner to avoid data collisions with data from other cores/logic, also communicated on sideband interconnect 1690.

CAB unit 1630 further includes an event blocking logic 1638, which may be configured to block incoming events when the processor is in particular low power states. Still further, CAB unit 1630 also includes a sideband interface 1639, which may interface with sideband interconnect 1690.

Note that in various embodiments, IDI 1670 is a wide, high-speed interconnect to accommodate primary (and often performance critical) communications between various cores and other IP blocks of an SoC at high speeds. Instead, sideband interconnect 1690 may be configured for less performance critical communications, via use of a narrower channel and lower operating frequency, such as for communication of telemetry data and power management information as described herein.

In an embodiment, storage 1632 of CAB unit 1630 may be allowed to be accessed by PMA 1634 or by a verified access received via sideband interface 1639. In one such embodiment, this interface may include a security attribute identifier (SAI) logic to determine whether an access request to storage 1632 has a valid SAI security protection (e.g., a SAI value received with the request matches a SAI value associated with the storage location to be accessed). As such, storage 1632 may be secured to store sensitive content.

In an embodiment, appropriate clocking logic may be applied to the various core perimeter logics to enable the storages and logic therein to be accessed in particular low power states. In an embodiment, double clocking logic may be applied to the storages of the sustain power domains. As one example, a cache coherent fabric (CCF) clock may be provided to the storages for standard read/write operations. In turn, a CRi clock may be provided to the storages for save/restore operations.

Understand that a processor may include additional components and circuitry. In the illustration of FIG. 16, processor 1600 further includes a power delivery unit 1640, which in an embodiment may include one or more fully integrated voltage regulators, a clock circuit 1650, which in an embodiment may be implemented as a phase lock loop, and a digital thermal sensor 1660. As seen, each of these components may communicate with the other components of processor 1600 via interconnect 1675. Understand while shown with this particular processor implementation in FIG. 16, many variations and alternatives are possible.

Figure 17:
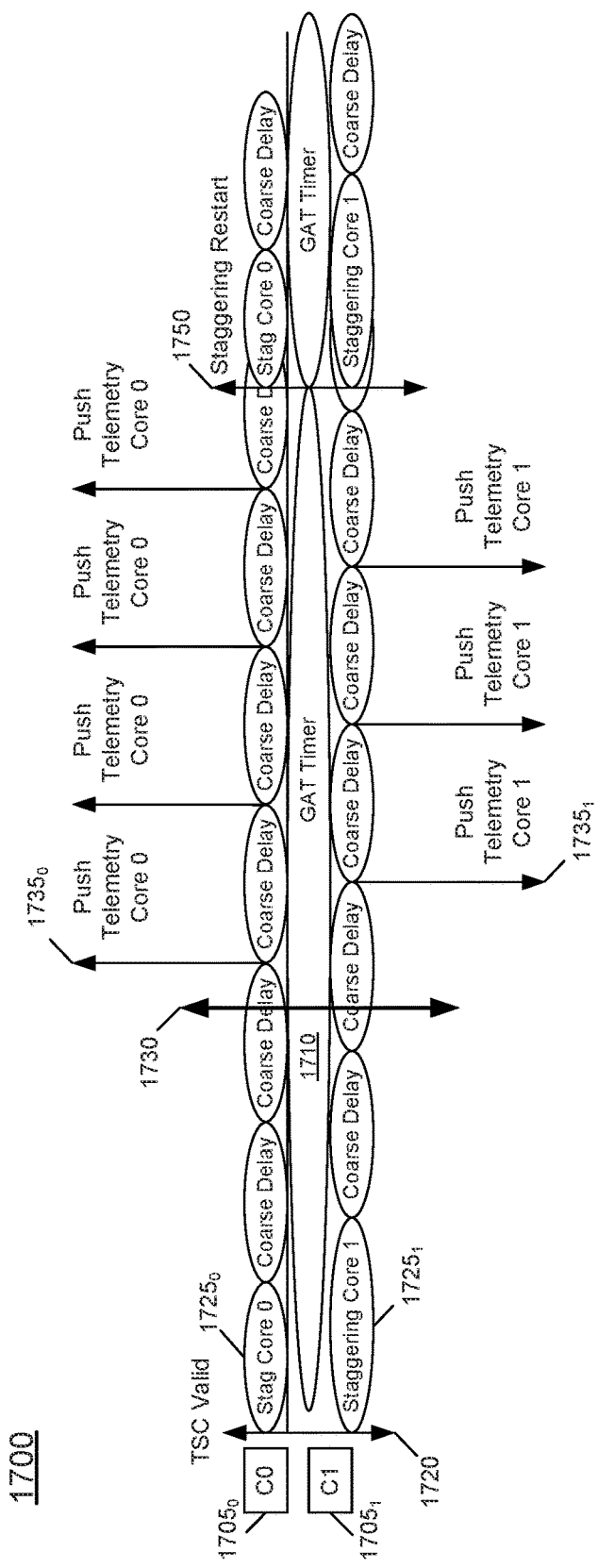
FIG. 17 is a timing diagram of telemetry data communication in accordance with an embodiment of the present invention.

Referring now to FIG. 17, shown is a timing diagram illustrating communication of telemetry data in a system 1700 in accordance with an embodiment of the present invention. Multiple cores $1705_0$ and $1705_1$, e.g., of a multicore processor, may be configured to provide telemetry data to a PCU or other power manager of the processor or other SoC. To prevent traffic collisions between data communicated by the different cores, embodiments provide techniques to ensure that the telemetry data communicated by the different cores are staggered so that such collisions do not occur.

To this end as shown in FIG. 17, responsive to receipt of a timestamp counter (TSC) valid indication at time 1720, such as during a reset flow of the processor, a global alignment counter 1710 (also referred to as "GAT timer") is initiated. Further responsive to initiation of this counter, different stagger periods $1725_0$ and $1725_1$ may begin in the corresponding cores. These stagger periods may be of different time values, e.g., as communicated from a PCU or other control logic. Note that communication of this stagger period value may be sent by the PCU via a configuration write command on a sideband channel. In addition, the cores may further include one or more delay counters such as coarse and fine delay counters, which may be used to indicate, at an expiration thereof, when a given core is allowed to communicate particular telemetry data. In some embodiments, each given delay counter of each of the cores may be set at the same delay value. But with the different stagger periods of each core occurring before initiation of the delay counters, each delay counter counts asymmetrically (even if operating at the same frequency and for the same duration (e.g., counter period)). Note that these different counters and values, e.g., the GAT counter, the delay counters and the stagger period, can all be set at different values.

Note further that until a threshold value of the GAT timer is reached, no core is allowed to communicate telemetry data. As will be described, this threshold may be set in different manners. When this threshold is reached at time 1730, communication of telemetry data, e.g., via a sideband channel such as a power management sideband channel, is unblocked. Accordingly, at an expiration of a given delay timer period for each core 1705, it communicates telemetry data $1735_0/1735_1$ as push telemetry data to be received by the PCU.

Note that as a given processor may run continuously for long periods of time, e.g., months and even years, it is possible for synchronization to be lost between the delay timers of the different cores, such that the staggering provided as described herein may be altered or even lost. Accordingly, embodiments further provide techniques to synchronize or restart staggering at a new stagger alignment period according to a given stagger schedule. More specifically, when GAT timer 1710 is reset, which may occur when the GAT counter reaches a restart limit, stagger periods occur again and a reset of the delay timers of the different cores then may be performed. As such, staggering as described herein may begin according to a new staggering restart occurrence 1750. Understand while shown at this high level in the embodiment of FIG. 17, many variations and alternatives are possible.

Figure 18:
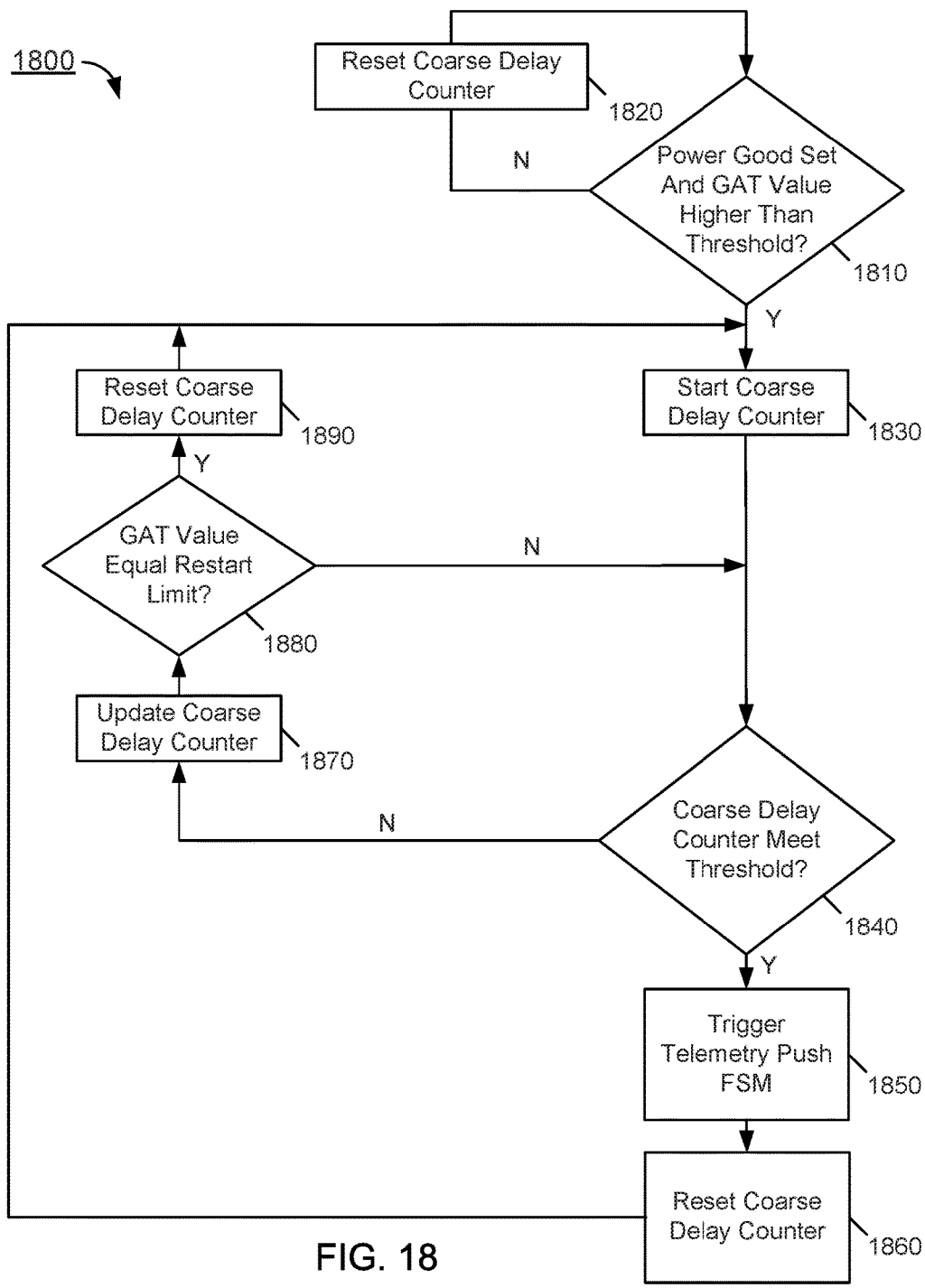
FIG. 18 is a flow diagram of a method in accordance with an embodiment of the present invention.

Referring now to FIG. 18, shown is a flow diagram of a method for controlling a delay timer in accordance with an embodiment of the present invention. More specifically, method 1800 shown in FIG. 18 may be performed by combinations of hardware circuitry, firmware, and/or software, such as delay control logic of a PMA or other circuitry of a core that is to control communication of telemetry data to a PCU or other power controller.

As shown in FIG. 18, method 1800 begins by determining whether various conditions have been met to enable initiation of a delay counter (diamond 1810). In the embodiment shown, these conditions include an indication of a power good signal from the system agent and a value of a GAT counter that is greater than a threshold. As discussed above, this threshold may correspond to a predetermined time after initiation of the GAT counter, before communication of telemetry data is allowed. If the determination at diamond 1810 is in the negative, control passes to block 1820 where the coarse delay counter is reset.

Otherwise, if the predetermined conditions have been met control passes to block 1830 where the coarse delay counter may be started. Then it is determined whether the value of this coarse delay counter meets or exceeds a threshold level (diamond 1840). If not, control passes to block 1870 where the coarse delay counter is updated (e.g., incremented). Next it is determined whether the value of the GAT counter meets a restart limit (diamond 1880). If so, the coarse delay counter is reset (block 1890), e.g., after a corresponding stagger period occurs. Control then passes back to block 1830, discussed above. Thus in this path, at a relatively long duration of counting in the GAT counter, a global reset occurs such that cores and/or other logic of a processor can have their corresponding stagger periods occur and delay counters reset, to ensure that the staggering techniques described herein remain at a desired level of staggering.

Still with reference to FIG. 18, instead at diamond 1840 if it is determined that the coarse delay counter value meets a threshold, control passes to block 1850. There a telemetry push finite state machine (FSM) of the PMA may be triggered. This triggering may cause communication of various telemetry data from the PMA to the PCU. Understand that the particular type and format of telemetry data collected and communicated may be based on information received from the PCU or other source, e.g., as indicated by various configuration messages. After triggering of the telemetry push FSM, control passes to block 1860, where the coarse delay counter is reset. Understand while shown with this particular implementation in the embodiment of FIG. 18, many variations and alternatives are possible. Furthermore, while method 1800 is with regard to a coarse delay counter, understand that operation may proceed similarly for control of other delay counters, with the only difference being that the counter control and comparisons are done with regard to a different delay counter, rather than a coarse delay counter.

Figure 19:
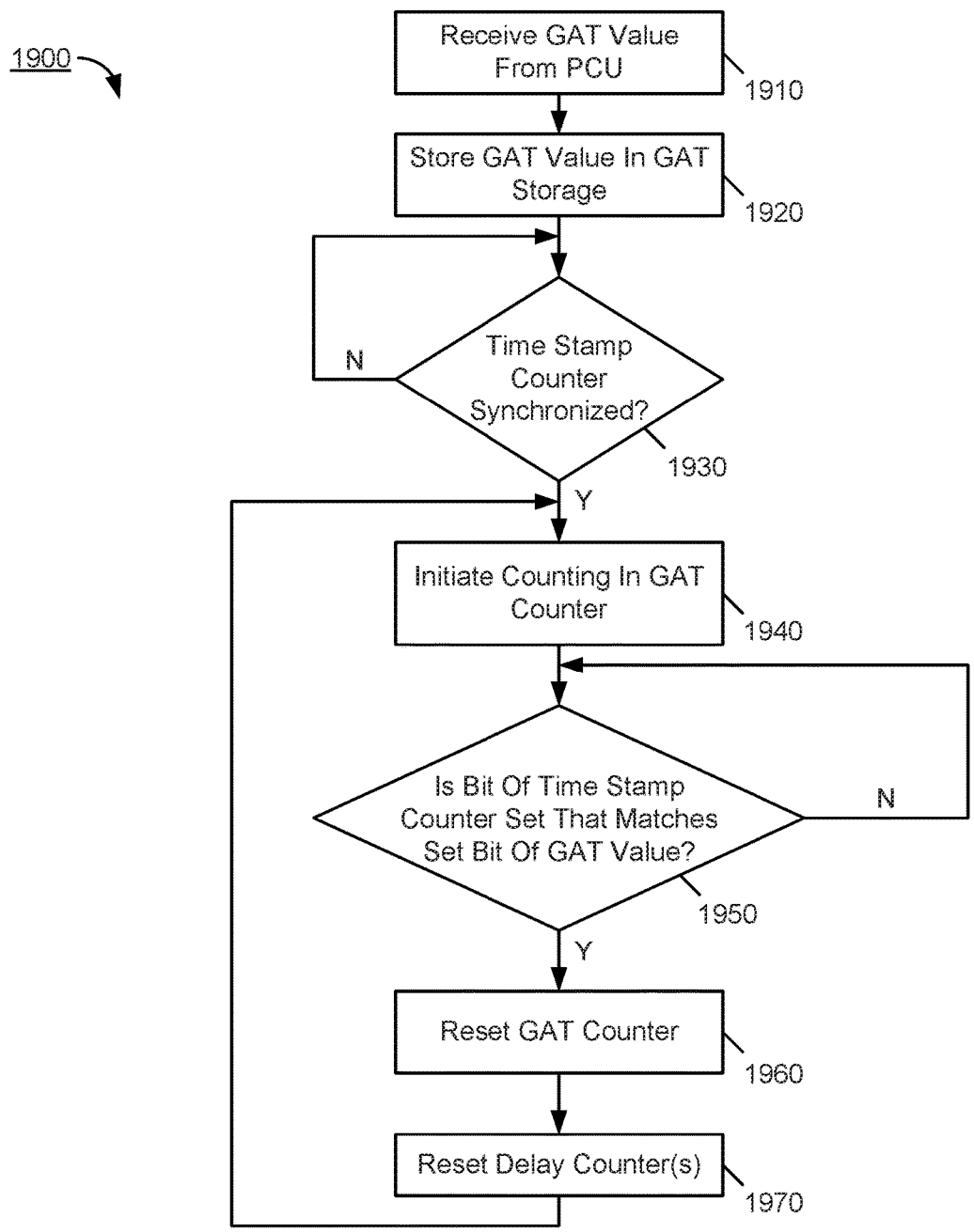
FIG. 19 is a flow diagram of a method in accordance with another embodiment of the present invention.

Referring now to FIG. 19, shown is a flow diagram of a method for controlling a global alignment timer in accordance with an embodiment of the present invention. As illustrated in FIG. 19, method 1900 begins by receiving a GAT value, e.g., from a PCU (block 1910). As an example, such value may be received in various cores and other logic of a processor from the PCU on startup. Such GAT value may be configured for a particular processor and may be included with various configuration information, e.g., as provided by BIOS or other system software. In other cases, the GAT value may be hard-coded, e.g., by way of fuse programming in the PCU. In any event, control passes from block 1910 to block 1920 where the GAT value may be stored in a GAT storage of the PMA. Note that this GAT value may, in an embodiment, be a 30-bit value, in which a single bit is set to a logic one. This value corresponds to a stagger alignment period, and which may be used for comparison to a TSC value to determine when the corresponding set bit of the GAT value is set in the TSC counter.

Next it is determined at diamond 1930 whether the timestamp counter is synchronized. Upon synchronization, control passes to block 1940 where counting may be initiated in the GAT counter. During counting operations, it is determined at diamond 1950 whether the bit of the timestamp counter that corresponds or matches the set bit of the GAT value is set (diamond 1950). If so, control passes to block 1960 where the GAT counter is reset. Note that this determination at diamond 1950 is also shown at diamond 1880 of FIG. 18. Furthermore, understand that the responsive to this reset of the GAT counter, one or more delay counters of the PMA also may be reset (block 1970), e.g., after a stagger period occurs. Note that this reset operation corresponds to block 1890 of FIG. 18. As shown, control passes back to diamond 1950, for further counting operations with regard to the GAT counter in a next stagger alignment period. Understand while shown at this high level in the embodiment of FIG. 19, many variations and alternatives are possible.

Figure 20:
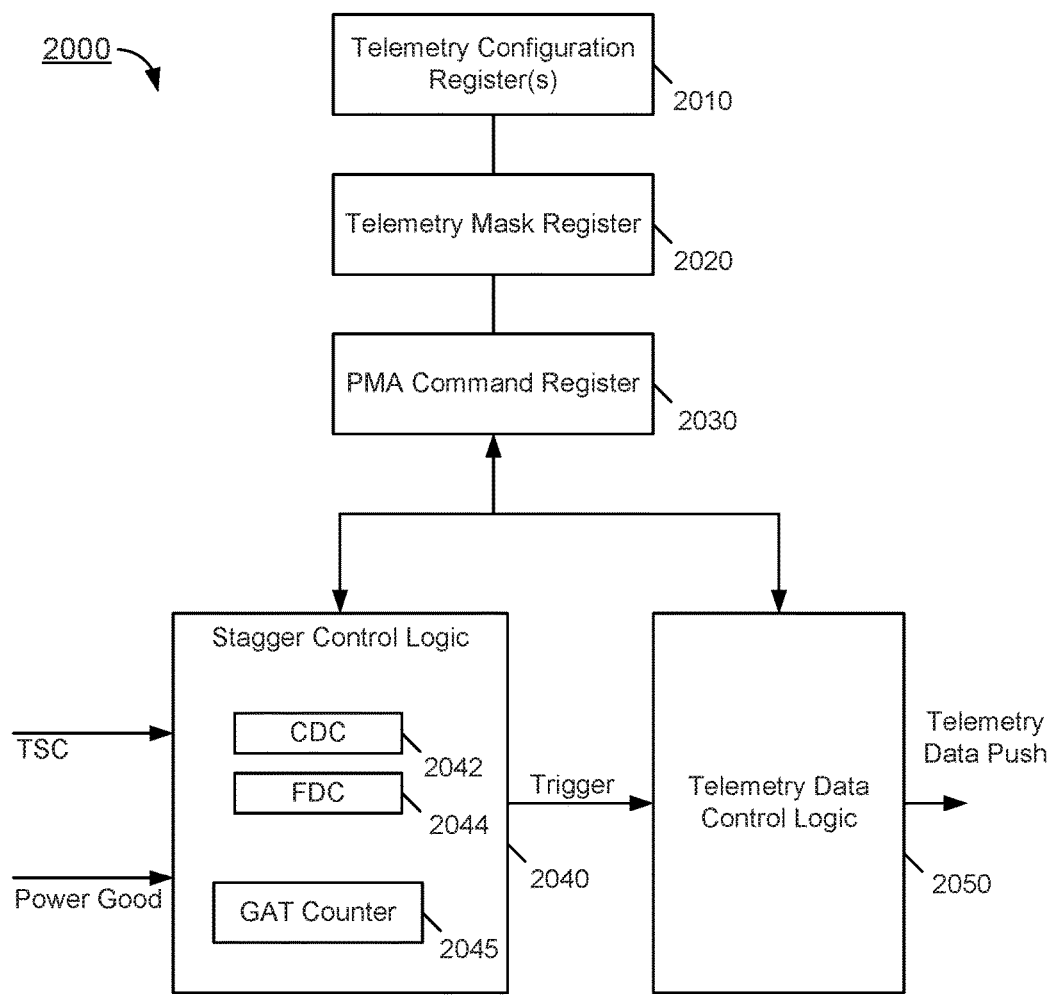
FIG. 20 is a block diagram of a power management agent in accordance with an embodiment of the present invention.

Referring now to FIG. 20, shown is a block diagram of a PMA 2000 in accordance with an embodiment of the present invention. Such PMA may be included in a core or other logic of a processor. Understand that each core or other logic may include a similarly arranged PMA. Of course in other embodiments, rather than a separate PMA, the circuitry shown in FIG. 20 may be implemented within other circuitry of a core/logic.

As illustrated, PMA 2000 includes various storages, including one or more telemetry configuration registers 2010, a telemetry mask register 2020, and a PMA command register 2030. Telemetry configuration register 2010 may be configured to store various configuration information associated with the telemetry data collection, processing, and communication as described herein. Telemetry mask register 2020 may be configured to store telemetry mask information to indicate corresponding telemetry data to be collected/communicated, or not. In turn, PMA command register 2030 may be configured to store, at least in part, enable information to indicate whether telemetry data is enabled/disabled for operation, e.g., based on overall core/processor power state.

Still with reference to FIG. 20, PMA 2000 further includes a stagger control logic 2040. In various embodiments, stagger control logic 2040 may be configured, e.g., at least in part based on information in telemetry configuration register 2010 to perform control of staggering of communications via a sideband channel, such as a power management sideband channel, as described herein. As illustrated, stagger control logic 2040 includes various storages or counters, which in an embodiment may be configured as incrementing counters. Specifically, a coarse delay counter 2042 is present, along with a fine delay counter 2044. In addition, a GAT counter 2045 is present. Understand while shown with these particular counters in the embodiment of FIG. 20, additional and/or different counters may be present in a given embodiment. Stagger control logic 2040 may perform methods 1800 and 1900, in an embodiment. To effect such operations, stagger control logic 2040 receives the TSC value and a power good signal. Of course other signals may be received and used by stagger control logic 2040.

As described herein, when a given delay counter meets its threshold, a trigger is sent to a telemetry data control logic 2050. In various embodiments, telemetry data control logic 2050 may be configured to maintain telemetry data, e.g., associated with a plurality of different counter types, such as one or more core activity counters, one or more core inactivity counters and so forth. Then responsive to receive this trigger signal a push FSM of this logic may send one or more telemetry data reports as a telemetry data push communication, e.g., via a sideband bus. Understand while shown at this high level in the embodiment of FIG. 20, many variations and alternatives are possible.

Figure 21:
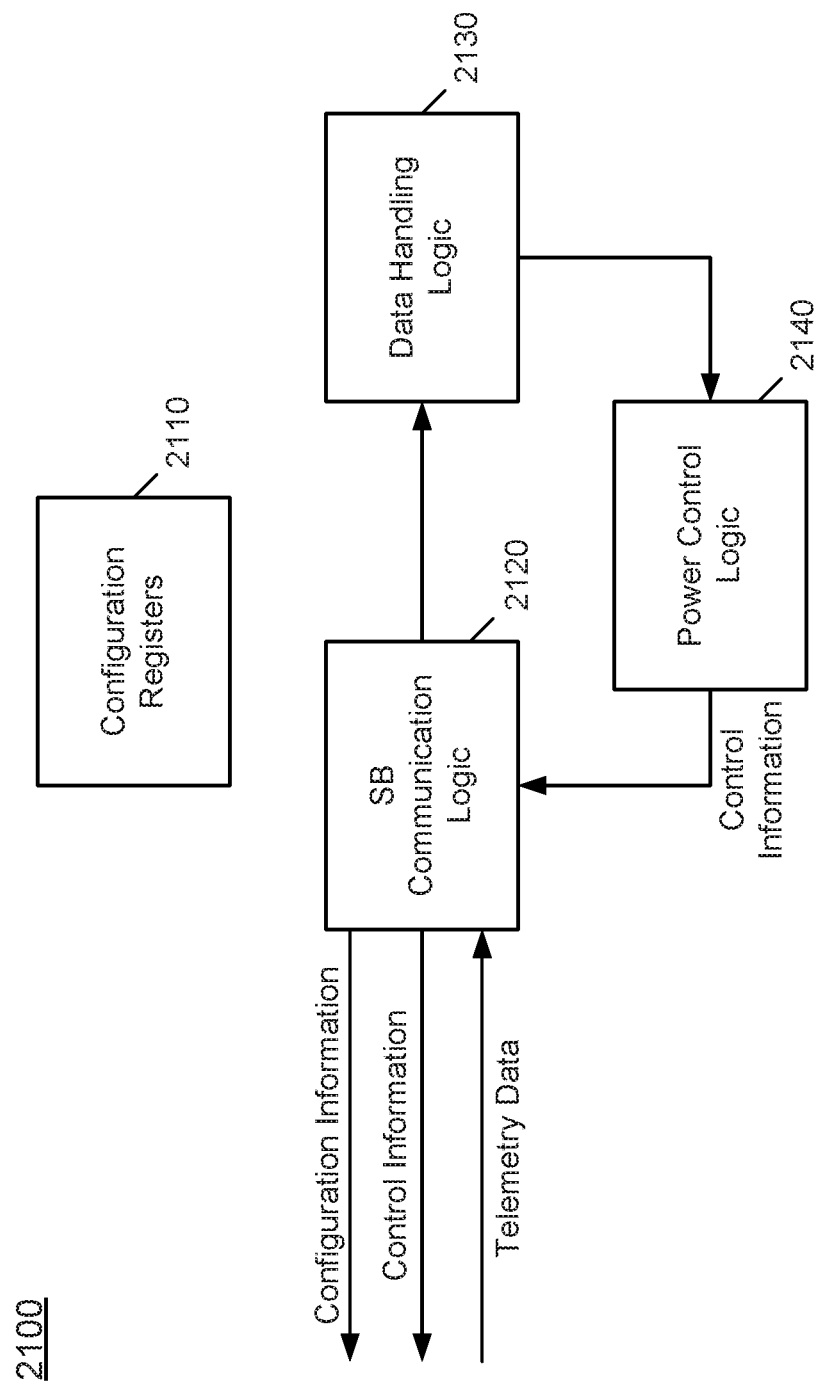
FIG. 21 is a block diagram of a power control unit in accordance with an embodiment of the present invention

With reference to FIG. 21, shown is a block diagram of a portion of a PCU in accordance with an embodiment. PCU 2100 includes various circuitry to perform telemetry data control, receipt and processing as described herein. As illustrated, PCU 2100 includes a set of configuration registers 2110. At least some of such registers may include telemetry data configuration information, to be used in PCU 2100, as well as to be communicated to various PMA's or other circuitry of cores/logic to enable their configuration of telemetry data collection and communication.

As further illustrated, PCU 2100 includes a sideband communication logic 2120, which may be configured to control communications via a power management sideband channel. As seen, such sideband may be used to communicate configuration information, control information, and telemetry data. When telemetry data is received in sideband communication logic 2120, it may be provided to a data handling logic 2130, which may disassemble an incoming telemetry data packet and process it accordingly, e.g., accumulating it with previously obtained data or so forth.

Such processed telemetry data may be provided to a power control logic 2140, which may be configured control power management operations, such as causing cores or other logic to be placed into certain activity or inactivity states, based at least in part on this telemetry data. For example, when the telemetry data indicates a thermal condition occurring in a core, power control logic 2140 may generate control information to be provided via sideband communication logic 2120 to the core, to cause the core to update one or more operating parameters of the core, such as frequency and/or voltage. As an example, the control information may cause the core enter into a lower performance state (at a lower frequency and/or voltage), such that the thermal condition can be resolved. Of course many other control techniques are possible. Understand while shown at this high level in FIG. 21, many variations and alternatives are possible.

Referring now to Table 1, shown is an example format for communication of telemetry data in accordance with an embodiment. More specifically, Table 1 shows a telemetry data format for communication of so-called fast telemetry data, namely data that is to be communicated at a higher frequency, due to potentially faster updates to such information. Understand that in an embodiment, this telemetry data format may be communicated to a given core or other logic from a PCU as configuration information to be stored in a configuration register.

TABLE 1

| Field | Width | Comments |
| --- | --- | --- |
| General CR info | 48 | Source ID (PMA), destination (P-unit), type (CR write) |
| P-unit CR address | 0xa00 | |
| DATA 0 | 28 | Fast telemetry from push bus |
| TELE_ID 0 | 4 | Fast telemetry counter ID sent to P-unit |
| DATA 1 | 28 | Fast telemetry from push bus |
| TELE_ID 1 | 4 | Fast telemetry counter ID sent to P-unit |

As seen in Table 1 above, this data format for fast telemetry data provides for addressing information (such as a source ID for the PMA of the given core and destination which may be a location in a PCU), a write type, and particular types of telemetry data with corresponding identifier. Examples of fast telemetry data may include, in an embodiment C0 residency, instructions retired, and so forth. Although the scope of the present invention is not limited in this regard, in an embodiment a fast delay counter may be configured to cause such fast telemetry data to be communicated between approximately 10 microseconds and 100 microseconds.

Referring now to Table 2, shown is an example format for communication of so-called slow telemetry data, namely data that is to be communicated at a lower frequency (e.g., thermal information), due to potentially slower updates to such information.

TABLE 2

| Field | Width | Comments |
| --- | --- | --- |
| General CR info | 48 | Source ID (PMA), destination (P-unit), type (CR write) |
| P-unit CR address | 0xb00 | |
| DATA 0 | 12 | 12 b of data ([11]-valid; [10] reserved, [9] reserved, [8] - sign; [7:1] - temp; [0] −1 for 0.5 deg); range = −127, 127 w/ 0.5 deg granularity |

TABLE 2-continued

| Field | Width | Comments |
|---|---|---|
| TELE_ID0 | 4 | Telemetry ID sent to P-unit |
| DATA 1 | 12 | 12 b of data ([11]-valid; [10] reserved, [9] reserved, [8] - sign; [7:1] - temp; [0] −1 for 0.5 deg); range = −127, 127 w/ 0.5 deg granularity |
| TELE_ID 1 | 4 | Telemetry ID sent to P-unit |
| DATA 2 | 12 | 12 b of data ([11]-valid; [10] reserved, [9] reserved, [8] - sign; [7:1] - temp; [0] −1 for 0.5 deg); range = −127, 127 w/ 0.5 deg granularity |
| TELE_ID 2 | 4 | Telemetry ID sent to P-unit |
| DATA 3 | 12 | 12 b of data ([11]-valid; [10] reserved, [9] reserved, [8] - sign; [7:1] - temp; [0] −1 for 0.5 deg); range = −127, 127 w/ 0.5 deg granularity |
| TELE_ID 3 | 4 | Telemetry ID sent to P-unit |

As seen in Table 2 above, this data format for slow telemetry data provides for addressing information, a write type, and particular types of telemetry data with corresponding identifier. Examples of fast telemetry data may include, in an embodiment thermal information, current levels and so forth. Although the scope of the present invention is not limited in this regard, in an embodiment a slow delay counter may be configured to cause such slow telemetry data to be communicated between approximately 100 microseconds and 1000 microseconds.

Additional configuration information may be communicated from the PCU to the cores or other logic to control telemetry push configuration. Referring now to Table 3, shown is an illustration of a configuration storage that provides information regarding delay values, format and sampling mode information.

TABLE 3

| Telemetry Configuration Storage | | | | | |
|---|---|---|---|---|---|
| 31:29 | 28:17 | 16:5 | 4:2 | 1 | 0 |
| Reserved | Fast Coarse Delay | Slow Coarse Delay | Fine Delay | Format | Sample Mode |

As illustrated in Table 4, the various fields of this telemetry configuration information may provide the following encodings, in an embodiment.

TABLE 4

| Field | Width | Comments |
|---|---|---|
| SAMPLE_MODE | 1 | 1-Periodic<br>0-One Shot |
| FORMAT | 1 | 1-MsgD<br>0-Cr Write |
| FINE_DELAY | 3 | Specifies delay between two each telemetry item being push as telemetry push sequence. (e.g., X1 Clocks) |
| SLOW_COARSE_DELAY | 12 | Specified period of push sequence (in 128 * 8* e.g., X1 Clock period) |
| FAST_COARSE_DELAY | 12 | Specified period of push sequence (in 128 * 8* e.g., X1 Clock period) |
| RSVD | 3 | Reserved |

Thus as illustrated in Table 4, telemetry data sampling may be according to a periodic schedule or a single sampling (one-shot). The format may include message data, which provides telemetry data, and a control register write. In addition, various delay values are provided as detailed above.

Referring now to Table 5, shown is an example format of a telemetry mask register in accordance with an embodiment. This telemetry mask register, as detailed in Tables 5 and 6 below may be used to provide an indication as to particular types of telemetry data to be collected/communicated.

TABLE 5

| Telemetry Mask Register | |
|---|---|
| 31:16 | 15:0 |
| Fast telemetry mask per slot | Slow telemetry mask per slot |

With reference to Table 6, shown is an example encoding or bit description for the telemetry mask information identified in Table 5.

TABLE 6

| Field | Width | Comments |
|---|---|---|
| SLOW_TEL_MASK | 16 | Bit per slot read/not read telemetry |
| FAST_TEL_MASK | 16 | Bit per slot read/not read telemetry |

Table 7 below shows exemplary enable/disable telemetry information that may be stored in a command register of a PMA or other location. In an embodiment, telemetry communication may be disabled when a processor enters a particular low power state, such as a package low power state. Similarly, telemetry communication may be enabled when the processor exits such low-power state. Similarly, thermal telemetry communication may be enabled/disabled in the same manner.

In certain embodiments, the sideband communication link on which telemetry data is communicated may be active so long as a core clock is not stopped. Although the scope of the present invention is not limited in this regard, reading of this telemetry data may take a given number of clock cycles. If a telemetry read is triggered before a drain process is completed (e.g., a global observation drain), the telemetry read may continue and a stop clock operation is delayed until such telemetry data read is completed. Instead if a telemetry read is triggered after this drain process is completed, the telemetry read process itself is delayed.

In an embodiment, when a core is in a particular low-power state (e.g., core C6 state), slow telemetry data is not affected by such status. However, fast telemetry data may be affected. Two corner cases may exist in such state. First, assume the core is in the C6 state and a delay timer has expired. Because all fast telemetry data in this situation is zero, there is no need to communicate from the core. In another case, assume that the core receives a request to enter the C6 state while it has valid telemetry data. To avoid losing such data, responsive to receipt of this low power state request, the telemetry data may be sent, without reference to the delay counter. In some cases, the core may send a request to increase a length of time before entry into the low power state to enable all such telemetry data to be communicated before entry into the low power state. Of course other options are possible in other embodiments.

TABLE 7

| Telemetry Enable/Disable | Thermal Enable/Disable |
|---|---|

One or more GAT counter registers in accordance with an embodiment of the present invention can provide a delay value between telemetry communication from one subsystem (e.g., core) and another. Referring now to Table 8, a GAT restart register provides information regarding when a GAT counter is to be reset, which in turn begins a new stagger alignment period.

TABLE 8

GAT Restart Register

| 31 | 30:0 |
|---|---|
| MODE | LIMIT |

Table 9 provides encoding information for the limit and sample mode fields of this GAT restart register.

TABLE 9

| Field | Width | Comments |
|---|---|---|
| LIMIT | 30:0 | Only one bit will set in the register when corresponding bit in TSC will set, the limit will trigger |
| SAMPLE_MODE | 31 | 1 = Periodic, 0 = one time |

The following examples pertain to further embodiments.

In one example, a processor comprises: a plurality of cores to execute instructions, at least some of the plurality of cores including a telemetry data control logic to send a first telemetry data packet to a power controller according to a stagger schedule to prevent data collisions, and a GAT counter to count a stagger alignment period; and the power controller to receive the first telemetry data packet from the at least some of the plurality of cores according to the stagger schedule.

In an example, the at least some of the plurality of cores further comprises a first delay counter to count a first delay period, where the telemetry data control logic is to send the first telemetry data packet responsive to expiration of the first delay period.

In an example, a first core of the plurality of cores comprises a power management agent including a stagger control logic, the stagger control logic including the GAT counter and the first delay counter.

In an example, the stagger control logic is to prevent the data collisions based at least in part on the first delay counter, where the first delay counter of each of the at least some of the plurality of cores are to be controlled according to the stagger schedule.

In an example, the power management agent comprises a telemetry configuration register to store configuration information, the configuration information to provide a format for the first telemetry data packet.

In an example, the power management agent comprises a telemetry mask register to store telemetry mask information to indicate one or more types of telemetry data to be prevented from communication to the power controller.

In an example, the power controller comprises a sideband communication logic to send the configuration information to the at least some of the plurality of cores and receive the first telemetry data packet from the at least some of the plurality of cores.

In an example, the stagger alignment period corresponds to a threshold value of a timestamp counter of the processor.

In an example, the telemetry data control logic is to enable the GAT counter responsive to synchronization of the timestamp counter, and to enable the first delay counter after a stagger period following the GAT counter enable, each of the at least some of the plurality of cores associated with a different stagger period.

In an example, the power controller further comprises a power control logic to receive thermal information based at least in part on the first telemetry data packet received from the at least some of the plurality of cores and to cause at least one operating parameter of at least one of the plurality of cores to be updated responsive to the thermal information.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: initiating counting in a GAT counter of a first core of a processor, the GAT counter to maintain a stagger schedule between a plurality of cores of the processor; based at least in part on a value of a first delay counter of the first core, communicating telemetry data to a power controller of the processor from the first core, to prevent telemetry data collision with telemetry data of one or more other cores of the plurality of cores of the processor; determining whether a value of a corresponding portion of the GAT counter matches a first portion of a timestamp counter value of a timestamp counter of the processor; and responsive to determining that the value of the corresponding portion of the GAT counter matches the first portion of the timestamp counter value, resetting the GAT counter.

In an example, the method further comprises initializing the GAT counter responsive to synchronization of the timestamp counter of the processor.

In an example, the method further comprises enabling communication of the telemetry data to the power controller when the GAT counter reaches a first value.

In an example, the method further comprises: initiating a stagger period responsive to initiating the counting the GAT counter; and resetting the first delay counter after the stagger period.

In an example, the method further comprises preventing communication of second telemetry data from the first core to the power controller responsive to a value of a first portion of a telemetry mask register of the first core and communicating the telemetry data from the first core to the power controller responsive to a first value of a second portion of the telemetry mask register.

In an example, the method further comprises communicating the telemetry data to the power controller from the first core regardless of the value of the first delay counter responsive to a request for the first core to enter into a low power state.

In an example, the method further comprises based at least in part on a value of a second delay counter of the first core, communicating second telemetry data to the power controller from the first core, the second telemetry data comprising different telemetry fields than the telemetry data, where the second telemetry data is to be communicated to the power controller at a different periodicity than the telemetry data.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor having: a first core including a first counter to count a stagger alignment period, a first delay counter to count a first push period, and a first control logic to send a first telemetry data packet responsive to expiration of the first push period in the first delay counter; a second core including a second counter to count the stagger alignment period and a second delay counter to count the first push period, and a second control logic to send a second telemetry data packet responsive to expiration of the first push period in the second delay counter, where the expiration of the first push period in the second delay counter is staggered from the expiration of the first push period in the first delay counter, to prevent data collisions; and a power controller to receive the first telemetry data packet and the second telemetry data packet and cause an update to at least one operating parameter of at least one of the first core and the second core based at least in part on telemetry information in the first telemetry data packet and the second telemetry data packet. The system may further include a management controller coupled to the processor.

In an example, the power controller is to communicate at least some of the telemetry information to the management controller.

In an example, the first control logic is to: enable the first counter responsive to synchronization of a timestamp counter of the processor; enable the first delay counter after a stagger period following the first counter enable; enable the first control logic to send the first telemetry data packet responsive to the expiration of the first push period after the first counter reaches a first value; and reset the first counter responsive to a first portion of a value of the first counter matching a first portion of a timestamp counter value, and cause the first delay counter to be reset after a stagger period following the reset of the first counter.

Understand that various combinations of the above examples are possible.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores to execute instructions, at least some of the plurality of cores including a telemetry data control logic to send a first telemetry data packet to a power controller according to a stagger schedule to prevent data collisions, a global alignment (GAT) counter to count a stagger alignment period corresponding to a threshold value of a timestamp counter of the processor, and a first delay counter to count a first delay period, wherein the telemetry data control logic is to send the first telemetry data packet responsive to expiration of the first delay period, enable the GAT counter responsive to synchronization of the timestamp counter, and enable the first delay counter after a stagger period following the GAT counter enable, each of the at least some of the plurality of cores associated with a different stagger period; and
the power controller to receive the first telemetry data packet from the at least some of the plurality of cores according to the stagger schedule.

2. The processor of claim 1, wherein a first core of the plurality of cores comprises a power management agent including a stagger control logic, the stagger control logic including the GAT counter and the first delay counter.

3. The processor of claim 2, wherein the stagger control logic is to prevent the data collisions based at least in part on the first delay counter, wherein the first delay counter of each of the at least some of the plurality of cores are to be controlled according to the stagger schedule.

4. The processor of claim 2, wherein the power management agent comprises a telemetry configuration register to store configuration information, the configuration information to provide a format for the first telemetry data packet.

5. The processor of claim 4, wherein the power management agent comprises a telemetry mask register to store telemetry mask information to indicate one or more types of telemetry data to be prevented from communication to the power controller.

6. The processor of claim 4, wherein the power controller comprises a sideband communication logic to send the configuration information to the at least some of the plurality of cores and receive the first telemetry data packet from the at least some of the plurality of cores.

7. The processor of claim 1, wherein the power controller further comprises a power control logic to receive thermal information based at least in part on the first telemetry data packet received from the at least some of the plurality of cores and to cause at least one operating parameter of at least one of the plurality of cores to be updated responsive to the thermal information.

8. The processor of claim 1, wherein the power controller is to provide the different stagger period to the plurality of cores.

9. A non-transitory machine-readable medium having stored thereon data, which if used by at least one machine, causes the at least one machine to fabricate at least one integrated circuit to perform a method comprising:
initiating counting in a global alignment (GAT) counter of a first core of a processor responsive to synchronization of a timestamp counter of the processor, the GAT counter to maintain a stagger schedule between a plurality of cores of the processor;

initiating a stagger period responsive to initiating the counting in the GAT counter; resetting a first delay counter of the first core after the stagger period;

based at least in part on a value of the first delay counter of the first core, communicating telemetry data to a power controller of the processor from the first core, to prevent telemetry data collision with telemetry data of one or more other cores of the plurality of cores of the processor; determining whether a value of a corresponding portion of the GAT counter matches a first portion of a timestamp counter value of the timestamp counter of the processor; and responsive to determining that the value of the corresponding portion of the GAT counter matches the first portion of the timestamp counter value, resetting the GAT counter.

10. The non-transitory machine-readable medium of claim 9, wherein the method further comprises enabling communication of the telemetry data to the power controller when the GAT counter reaches a first value.

11. The non-transitory machine-readable medium of claim 9, wherein the method further comprises preventing communication of second telemetry data from the first core to the power controller responsive to a value of a first portion of a telemetry mask register of the first core and communicating the telemetry data from the first core to the power controller responsive to a first value of a second portion of the telemetry mask register.

12. The non-transitory machine-readable medium of claim 9, wherein the method further comprises communicating the telemetry data to the power controller from the first core regardless of the value of the first delay counter responsive to a request for the first core to enter into a low power state.

13. The non-transitory machine-readable medium of claim 9, wherein the method further comprises based at least in part on a value of a second delay counter of the first core, communicating second telemetry data to the power controller from the first core, the second telemetry data comprising different telemetry fields than the telemetry data, wherein the second telemetry data is to be communicated to the power controller at a different periodicity than the telemetry data.

14. A system comprising:
a processor having:
a first core including a first counter to count a stagger alignment period, a first delay counter to count a first push period, and a first control logic to send a first telemetry data packet responsive to expiration of the first push period in the first delay counter, wherein the first control logic is to:
enable the first counter responsive to synchronization of a timestamp counter of the processor;
enable the first delay counter after a stagger period following the first counter enable; and
send the first telemetry data packet responsive to the expiration of the first push period after the first counter reaches a first value;
a second core including a second counter to count the stagger alignment period and a second delay counter to count the first push period, and a second control logic to send a second telemetry data packet responsive to expiration of the first push period in the second delay counter, wherein the expiration of the first push period in the second delay counter is staggered from the expiration of the first push period in the first delay counter, to prevent data collisions; and
a power controller to receive the first telemetry data packet and the second telemetry data packet and cause an update to at least one operating parameter of at least one of the first core and the second core based at least in part on telemetry information in the first telemetry data packet and the second telemetry data packet; and
a management controller coupled to the processor.

15. The system of claim 14, wherein the power controller is to communicate at least some of the telemetry information to the management controller.

16. The system of claim 14, wherein the first control logic is to:
reset the first counter responsive to a first portion of a value of the first counter matching a first portion of a timestamp counter value, and cause the first delay counter to be reset after a stagger period following the reset of the first counter.

* * * * *